(12) United States Patent
Goldstein et al.

(10) Patent No.: US 12,549,842 B2
(45) Date of Patent: Feb. 10, 2026

(54) POP-OUT MOBILE CAMERAS AND COMPACT ACTUATORS

(71) Applicant: Corephotonics Ltd., Tel Aviv (IL)

(72) Inventors: Kobi Goldstein, Tel Aviv (IL); Ephraim Goldenberg, Tel Aviv (IL); Yiftah Kowal, Tel Aviv (IL); Dana Deutsch, Tel Aviv (IL); Vinay Bhus, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 18/860,662

(22) PCT Filed: Apr. 28, 2023

(86) PCT No.: PCT/IB2023/054411
§ 371 (c)(1),
(2) Date: Oct. 27, 2024

(87) PCT Pub. No.: WO2023/209652
PCT Pub. Date: Nov. 2, 2023

(65) Prior Publication Data
US 2025/0294231 A1 Sep. 18, 2025

Related U.S. Application Data

(60) Provisional application No. 63/431,091, filed on Dec. 8, 2022, provisional application No. 63/384,435, filed
(Continued)

(51) Int. Cl.
*H04N 23/57* (2023.01)
*H04N 23/50* (2023.01)

(52) U.S. Cl.
CPC ............. *H04N 23/57* (2023.01); *H04N 23/50* (2023.01)

(58) Field of Classification Search
CPC ............................... H04N 23/57; H04N 23/50
(Continued)

(56) References Cited

U.S. PATENT DOCUMENTS 3,877,296 A * 4/1975 Rihn ..................... G01P 15/08
73/653
3,995,318 A * 11/1976 Serizawa ............... G11B 15/61
360/84

(Continued)

FOREIGN PATENT DOCUMENTS

| JP | 2018 022123 A | 2/2018 | |
|---|---|---|---|
| KR | 100 857 296 B1 | 9/2008 | |
| WO | WO-2021059097 A2 * | 4/2021 | ............. H04N 23/55 |

OTHER PUBLICATIONS

Anonymous: "Understanding Closed and Open Coil Helical Springs Compression Springs, Extension Springs, Torsion Springs and Conical Springs in Stock", Jun. 27, 2024 (Jun. 27, 2024), XP093179617, Retrieved from the Internet: URL: https://www.stockspringscatalog.com/understanding-closed-and-open-helical-springs.html [retrieved on Jun. 27, 2024].
(Continued)

*Primary Examiner* — Matthew David Kim
(74) *Attorney, Agent, or Firm* — Nathan & Associates; Menachem Nathan

(57) ABSTRACT

Pop-out cameras having pop-out lens modules that comprise an inner part, an outer part having an outer part diameter $d_O$, a gap between the inner part and outer part having a maximum gap width $W_G\text{-Max}$, a moving lens group fixedly coupled to the inner part, the moving lens group including a plurality of N lens elements and having an optical axis, wherein a maximum lens element diameter of all the moving lens elements is $DA_{Max}$ and actuators that include an open spring located in the gap, wherein the open spring is operative to move the inner part relative to the outer part in
(Continued)

a first direction parallel to the optical axis to a pop-out state when no external forces are applied, wherein the inner part can move relative to the outer part in a second direction opposite to the first direction to a collapsed state under an external force, wherein do=$DA_{Max}$+a penalty p, wherein 0.5 mm<p<2.5 mm, and wherein 3 mm<$DA_{Max}$<15 mm.

34 Claims, 15 Drawing Sheets

Related U.S. Application Data on Nov. 20, 2022, provisional application No. 63/407,688, filed on Sep. 18, 2022, provisional application No. 63/337,072, filed on Apr. 30, 2022.

(58) Field of Classification Search
USPC .......................................................... 348/36
See application file for complete search history.

(56) References Cited

U.S. PATENT DOCUMENTS

| | | | | |
|---|---|---|---|---|
| 5,444,536 A * | 8/1995 | Satzger | ............. | G01B 11/2545 356/613 |
| 6,445,514 B1 * | 9/2002 | Ohnstein | ................ | G02B 7/005 359/813 |
| 6,449,434 B1 * | 9/2002 | Fuss | ..................... | F03G 7/0665 396/97 |
| 6,887,076 B2 | 5/2005 | Graham | | |
| 7,538,927 B1 * | 5/2009 | Fu | ..................... | G02B 26/0841 216/2 |
| 7,932,648 B2 * | 4/2011 | Jung | .................. | H02K 41/0356 396/85 |
| 8,018,668 B2 * | 9/2011 | Lee | ........................ | G02B 7/022 359/813 |
| 8,553,910 B1 * | 10/2013 | Dong | ..................... | H04R 1/028 351/158 |
| 8,814,447 B1 | 8/2014 | Hamburgen | | |
| 2002/0019594 A1 * | 2/2002 | McClellan | ....... | A61B 17/00234 600/562 |
| 2002/0163581 A1 * | 11/2002 | Kitazawa | ............. | H04N 23/687 348/208.6 |
| 2003/0098084 A1 * | 5/2003 | Ragner | ..................... | A47L 9/24 138/122 |
| 2003/0218789 A1 * | 11/2003 | Greywall | ........... | G02B 26/0841 359/224.1 |
| 2007/0151381 A1 * | 7/2007 | Pelkonen | ............. | G06F 1/1616 74/437 |
| 2009/0147340 A1 * | 6/2009 | Lipton | ................ | H10N 30/883 359/230 |
| 2019/0187486 A1 | 6/2019 | Goldenberg et al. | | |
| 2019/0336275 A1 * | 11/2019 | Coroneo | .................. | G02C 7/04 |
| 2021/0116976 A1 * | 4/2021 | Kim | ....................... | H04N 23/51 |
| 2021/0267442 A1 * | 9/2021 | Petersen | .............. | A61B 5/0066 |
| 2021/0397019 A1 | 12/2021 | Sue et al. | | |
| 2022/0004085 A1 | 1/2022 | Shabtay et al. | | |
| 2024/0195897 A1 * | 6/2024 | Choi | ..................... | G06F 1/1624 |

OTHER PUBLICATIONS

International Search Report and Written Opinion for International Application No. PCT/IB2023/054411, mailing date of Nov. 2, 2023.
Supplementary International Search Report and Written Opinion for International Application No. PCT/IB2023/054411, mailing date of Aug. 6, 2023.

* cited by examiner

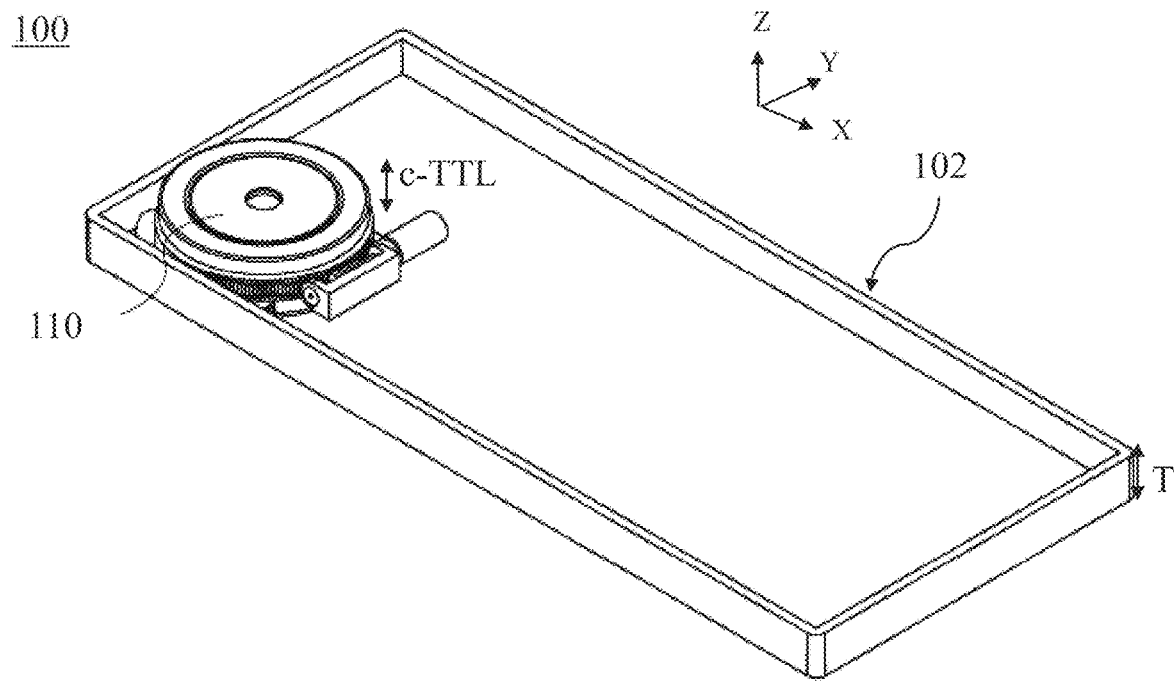
FIG. 1A  KNOWN ART
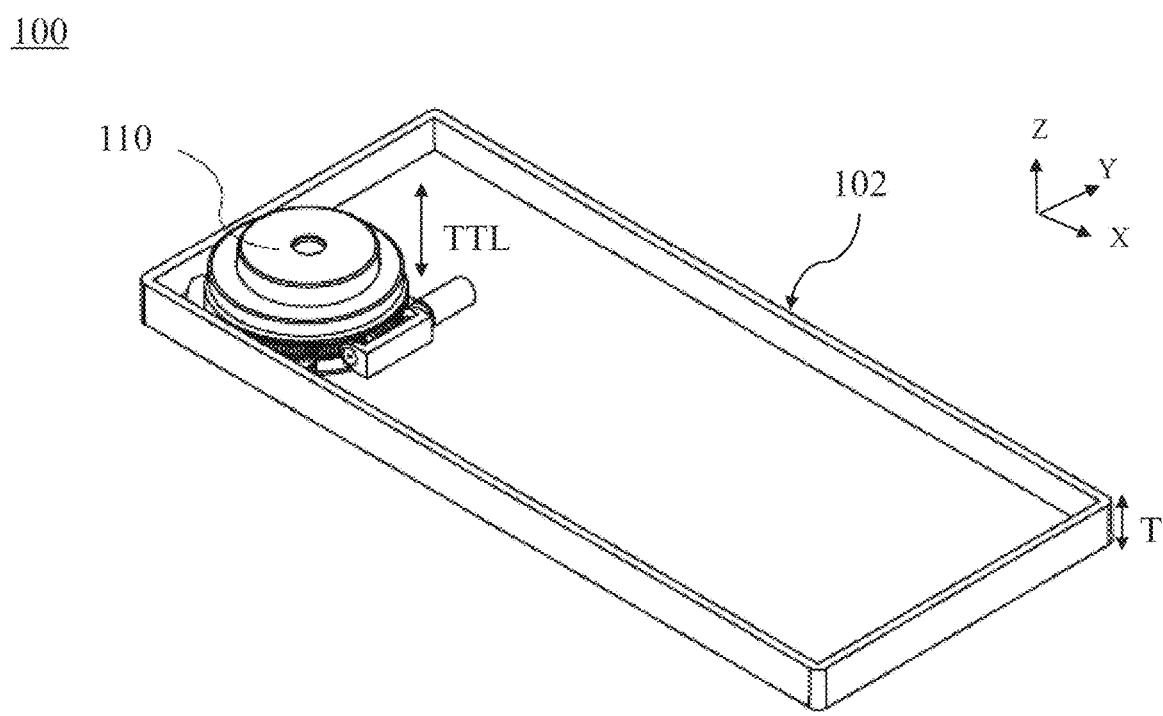
FIG. 1B  KNOWN ART

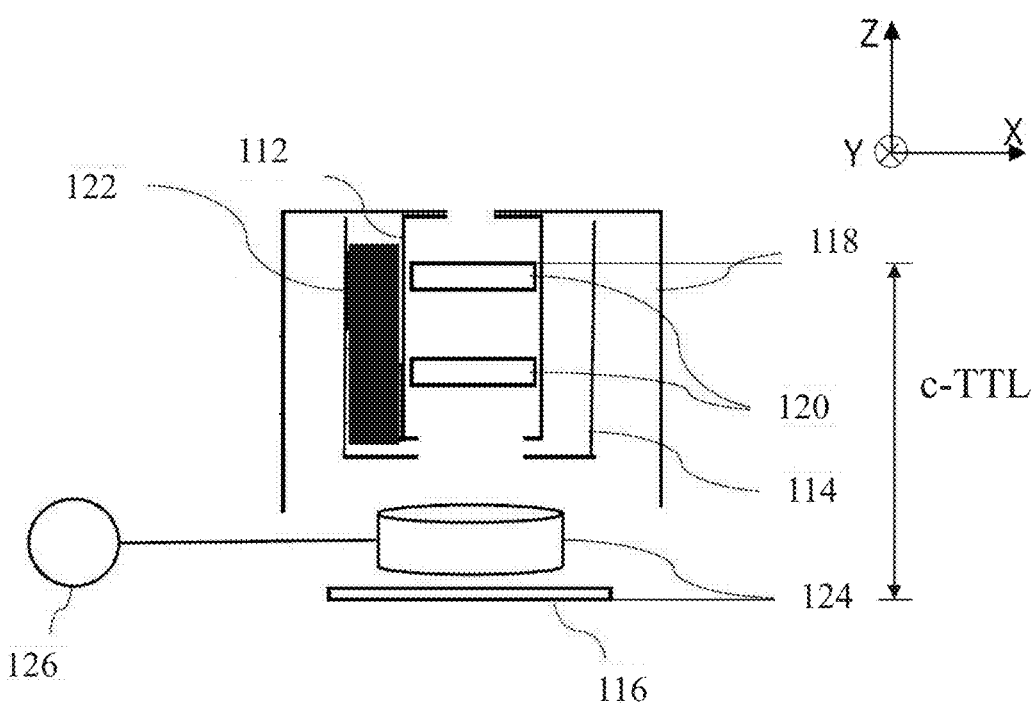
FIG. 1C  KNOWN ART
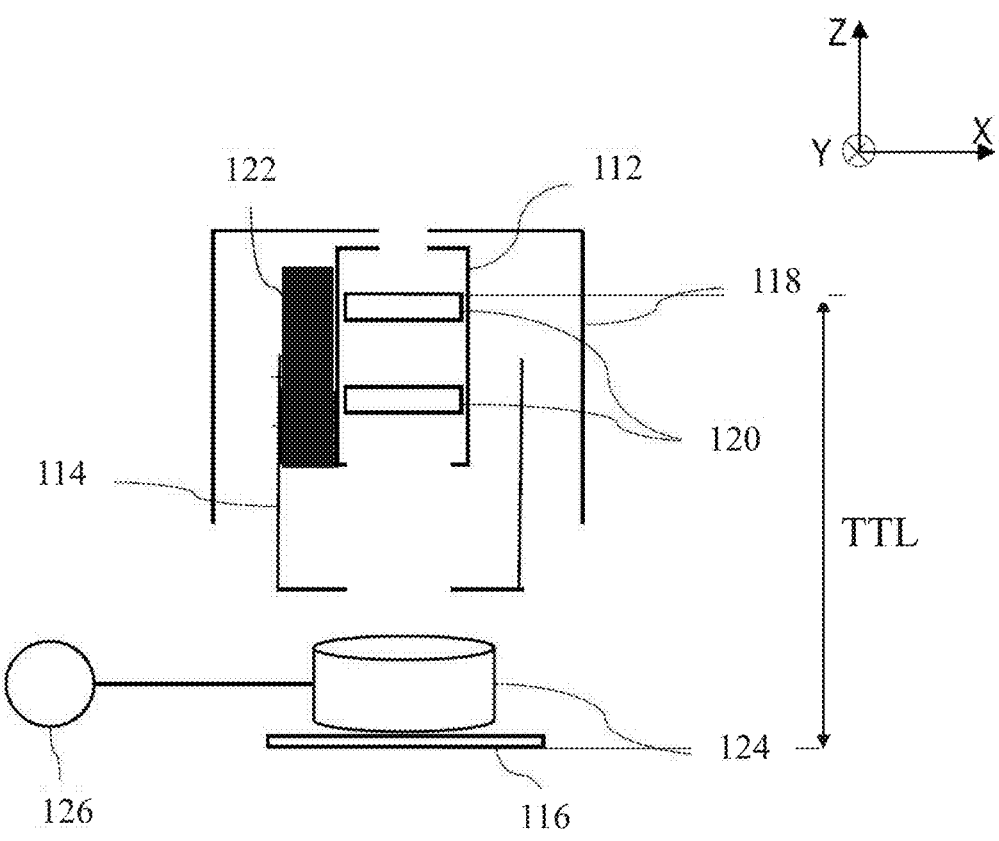
FIG. 1D  KNOWN ART

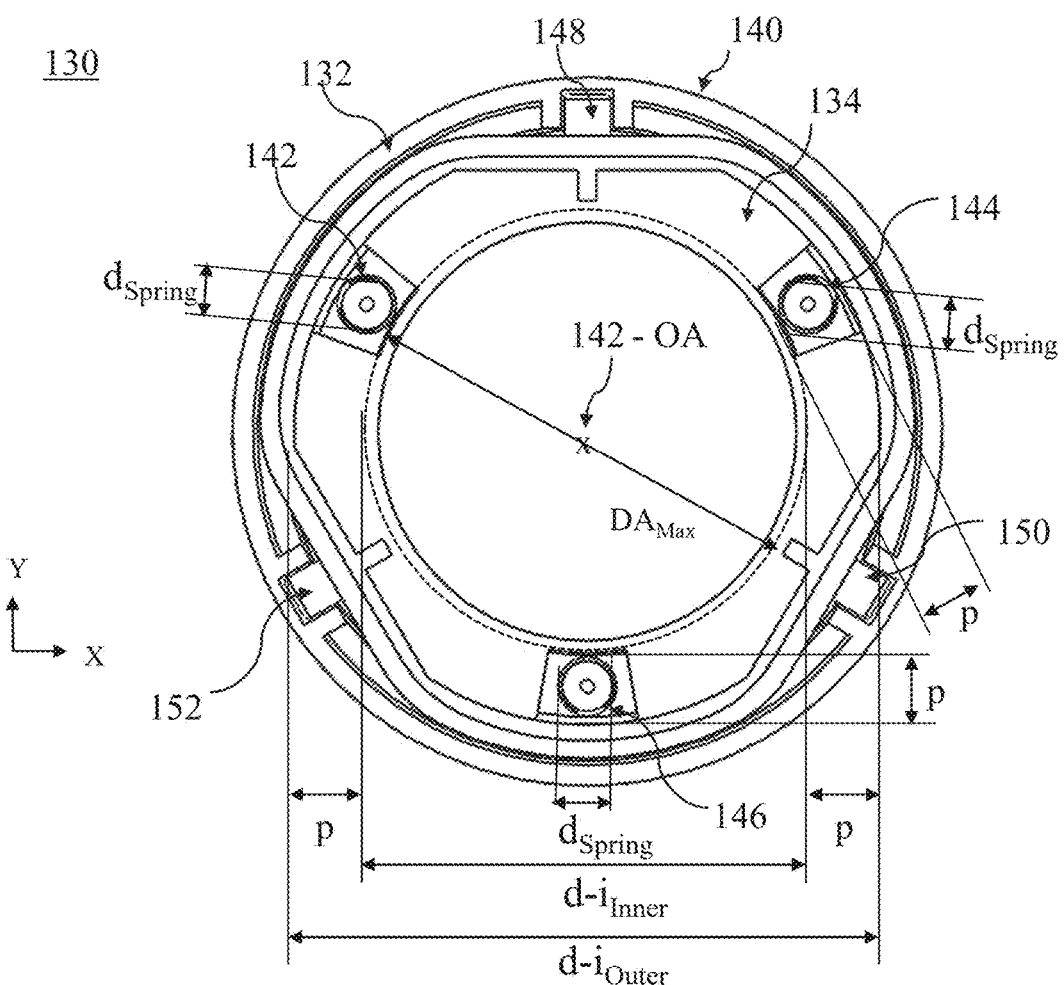
FIG. 1E            KNOWN ART
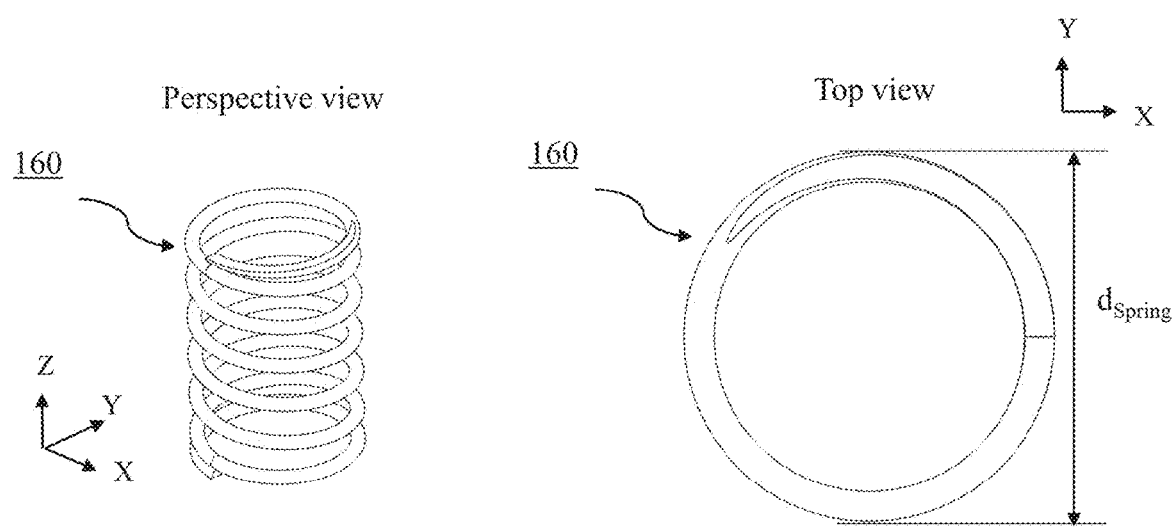
FIG. 1F            KNOWN ART

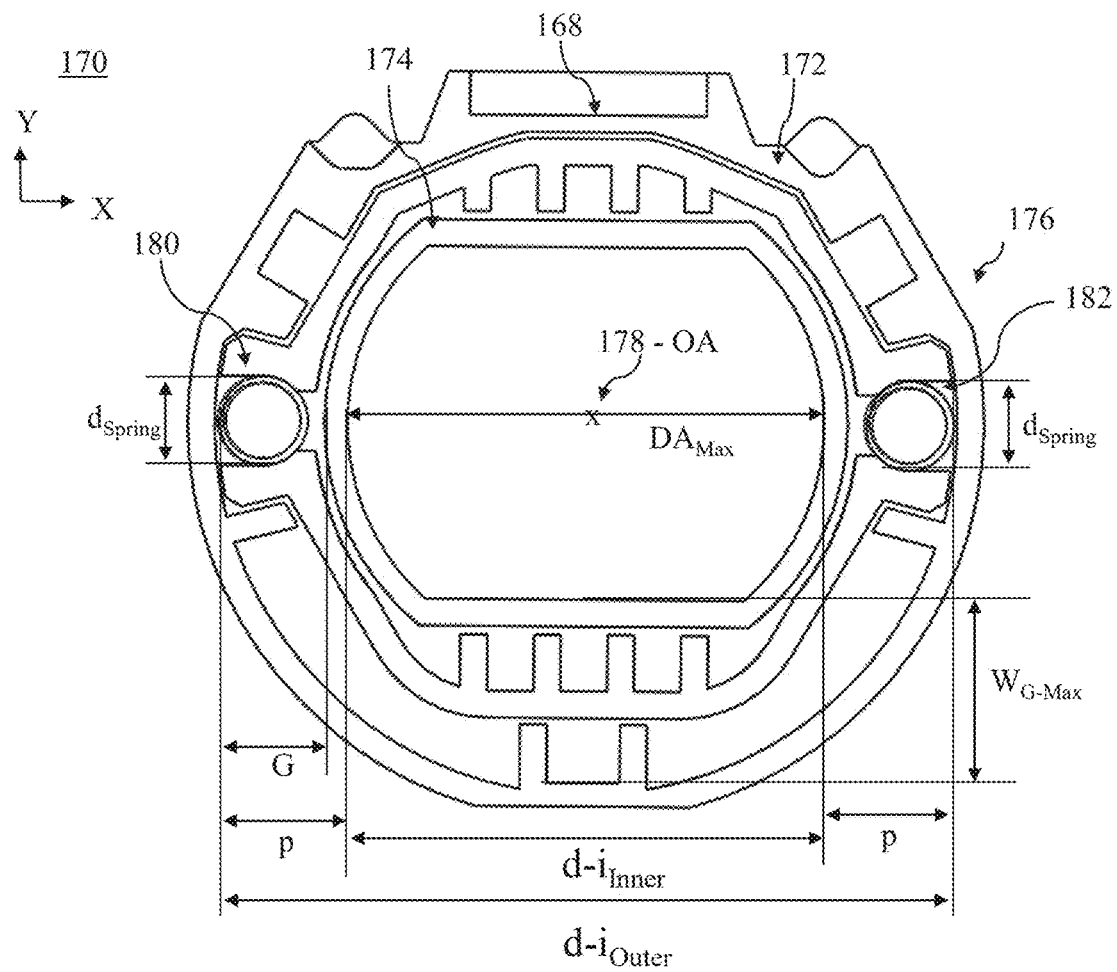
FIG. 1G      KNOWN ART
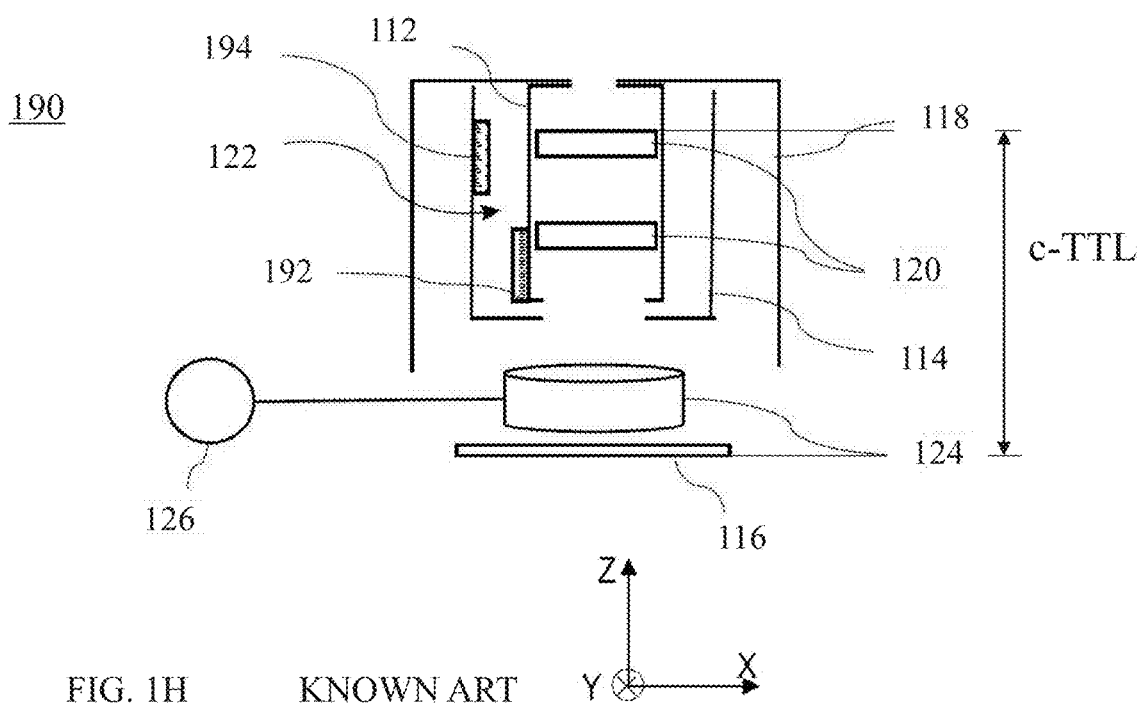
FIG. 1H      KNOWN ART

POP-OUT MOBILE CAMERAS AND COMPACT ACTUATORS

CROSS REFERENCE TO EXISTING APPLICATIONS

This is a 371 application from international patent application PCT/IB2023/054411 filed Apr. 28, 2023, which is related to and claims priority from U.S. Provisional Patent Applications Nos. 63/337,072 filed 30 Apr. 2022; 63/407,688 filed 18 Sep. 2022; 63/384,435 filed 20 Nov. 2022 and 63/431,091 filed 8 Dec. 2022, all of which are incorporated herein by reference in their entirety.

FIELD

The presently disclosed subject matter is generally related to the field of digital cameras and in particular to pop-out compact cameras including compact pop-out actuators.

Definitions

In this application and for optical and other properties mentioned throughout the description and figures, the following symbols and abbreviations are used, all for terms known in the art:

Total track length (TTL): the maximal distance, measured along an axis parallel to the optical axis of a lens, between a point of the front surface S1 of a first lens element L1 and an image sensor, when the system is focused to an infinity object distance.

Back focal length (BFL): the minimal distance, measured along an axis parallel to the optical axis of a lens, between a point of the rear surface S2N of the last lens element LN and an image sensor, when the system is focused to an infinity object distance.

Effective focal length (EFL): in a lens (assembly of lens elements L1 to LN), the distance between a rear principal point P' and a rear focal point F' of the lens.

f-number (f/#): the ratio of the EFL to an entrance pupil diameter.

BACKGROUND

Multi-aperture digital cameras (or multi-cameras) are standard in present day mobile handheld electronic devices (or in short "mobile devices", e.g. smartphones, tablets, etc.). A multi-camera often includes a Wide (or "Main") camera, an Ultrawide camera and a Tele camera.

In the pursuit of achieving ever-higher image quality (IQ), there is a need for ever-larger image sensors (in Wide cameras) and ever-larger zoom factors (in Tele cameras). Pop-out cameras ("POCs") combine the benefits of large image sensors or large zoom factors with a slim thickness of a mobile device that includes the POC. Pop-out cameras are described for example in co-owned international patent application PCT/IB2020/058697.

FIG. 1A illustrates schematically a mobile device numbered 100 that includes a known POC 110 in a first state ("collapsed state") when the camera is not in use. In the collapsed state, POC 110 has a first TTL ("collapsed TTL" or "cTTL"). The cTTL is compatible with the height dimensions of modern mobile devices, i.e. POC 110 in its collapsed state does not exceed a height (or thickness) of mobile device 100.

FIG. 1B illustrates schematically mobile device 100 with POC 110 in a second ("pop-out" or "P-O") state in which the POC is active (operational). In general, the POC is operational as a camera only in the pop-out state. In the P-O state, POC 110 has a "regular" P-O state TTL (referred to hereinafter as simply "TTL"). In the P-O state, POC 110 protrudes (or "pops out") from mobile device 100. Typically, a mobile device has a thickness T of about 5-15 mm. In the P-O state, the POC may protrude from (i.e. go beyond the T of the) mobile device 100 by about 1-10 mm. In the P-O state, POC 110 may have a TTL of about 8-25 mm, preferably about 10-20 mm. The ratio cTTL/TTL may be in the range 0.5-0.95.

POC 110 may be a Wide camera with a Wide camera effective focal length $EFL_W$ of about 8-20 mm, a Wide camera field-of-view $FOV_W$ of about 60-100 degrees (diagonal), a Wide camera sensor with a sensor diagonal SD of about 12-30 mm, and a ratio cTTL/SD<0.8. POC 110 may also be a Tele camera with a Tele camera $EFL_T$ of about 10-30 mm, a Tele camera $FOV_T$ of about 20-50 degrees and a ratio TTL/EFL<1.1. POC 110 may also be a Ultrawide (UW) camera with a UW camera $EFL_{UW}$ of about 5 mm-15 mm and a UW camera $FOV_{UW}$ of about 100-160 degrees.

FIGS. 1C-D show schematically in a cross-sectional view POC 110 in, respectively, a collapsed state and an extended state. Camera module 110 comprises a lens barrel 112, a lens carrier (or simply "carrier") 114 configured to receive lens barrel 112, and an image sensor 116. Camera module 110 may further comprise a retractable cover window. 118. Lens barrel 112 comprises an objective assembly. The objective assembly may hold coaxially a plurality (e.g. four to ten) lens elements 120 defining an optical axis Z of camera module 110. Lens barrel 112 may be positioned coaxially inwardly to carrier 114. Lens barrel 112 may be coupled to carrier 114 to allow axial displacement of lens barrel 112 relative to carrier 114. Carrier 114 may not move axially relative to image sensor 116, i.e. it may be fixed with respect to the Z axis.

Lens barrel 112 has a P-O (or "active", "operative" or "operational") state and a collapsed or "inactive" state. In the operative state, image sensor 116 is positioned in a focal plane or in an imaging plane of the objective assembly. The operative state of the lens barrel corresponds to a P-O (active) mode of camera module 110.

Camera module 110 further includes a barrel P-O assembly 122 configured to controllably move lens barrel 112 from the collapsed state to the operative state and to bias (or push) lens barrel 112 in the operative state. P-O assembly 122 may be configured to cause lens barrel 112 to axially move relative to the carrier 114 from the collapsed state towards the operative state. P-O assembly 122 may be positioned in an interstice (space) between carrier 114 and lens barrel 112. Such an interstice may be formed by cutting lens elements 120, i.e. performing a D-cut as known in the art. P-O assembly 122 may be configured to create a P-O force capable of overcoming the weight of the lens barrel, when this weight resists the axial movement of lens barrel 112 from the collapsed state to the operative state. Retractable cover window 118 may be configured to controllably move axially between a retracted position and an extended position. In the retracted position, cover window 118 may be positioned to abut on the most distal surface (e.g. a rim) of the lens barrel 112 in the collapsed state. In the extended position, cover window 118 may be positioned to provide for an axial gap with the most distal surface of lens barrel 112 in the operative state.

The motion of the cover window 118 between the retracted and extended positions and the motion of lens barrel 112 between the collapsed and extended positions may be coordinated. The axial movement of cover window 118 may be driven by a cover window P-O assembly 124 operated by an actuator 126. In the retracted position, cover window 118 may be configured to hold lens barrel 112 in the collapsed position. In the extended position, cover window 118 may be configured to provide for an axial gap with lens barrel 112 in the operative state. The axial gap may allow some axial movement of lens barrel 112 from the operative state, thereby allowing focusing (or autofocus "AF"). Cover window 118 may further be configured to cause lens barrel 112 to move from the operative state to the collapsed state when cover window 118 is operated to move from the extended position to the retracted position by window cover pop out assembly 124. In other words, window cover 118 may push on lens barrel 112 and collapse lens barrel 112 in the collapsed state when moving from extended position to the retracted position upon operation of the window cover P-O assembly 124. When cover window 118 is moved from the retracted position to the extended position, lens barrel 112 is released and a P-O force generated by P-O assembly 122 may drive lens barrel 112 towards the operative state.

FIG. 1E shows a known P-O lens module numbered 130 (also referred to as "optics frame") disclosed in FIG. 18E of PCT/IB2020/058697 in a top view. P-O lens module 130 may be used in a POC such as POC 110. P-O lens module 130 includes an outer part 132, an inner part 134, a lens barrel (not shown) such as lens barrel 112, a P-O assembly 140 and a P-O lens (not shown). P-O assembly 140 includes three springs 142, 144 and 146 and three pin-groove mechanisms 148, 150 and 152. Together, pin-groove mechanisms 148, 150 and 152 form a kinematic coupling mechanism between outer part 132 and inner part 134. When switching POC 110 from a P-O state to a collapsed state and vice versa, springs 142, 144 and 146 provide an actuation force of P-O assembly 140 and which moves inner part 134 relative to outer part 132 and the kinematic coupling mechanism provides a mechanical accuracy and repeatability of P-O assembly 140.

Each of springs 142, 144 and 146 has a spring diameter "$d_{spring}$". Inner part 134 has an outer diameter ("$d\text{-}i_{Outer}$") and an inner diameter ("$d\text{-}i_{Inner}$"), as shown. Outer part 132 has an inner radius ("$d\text{-}o_{Inner}$", not shown, see FIGS. 2A-B). We note that outer part 132 surrounds (or encircles) inner part 134, so that $d\text{-}o_{Inner}$ of outer part 132 is equal to or larger than $d\text{-}i_{Outer}$. $d\text{-}i_{Inner}$ is limited by springs 142, 144 and 146 and it represents a maximum aperture diameter ("$DA_{Max}$", as marked) of a P-O lens included in POC 110, i.e. $DA_{Max} = d\text{-}i_{Inner}$. The difference between $d\text{-}i_{Outer}$ and $d\text{-}i_{Inner}$ is referred to as "diameter penalty" or simply "penalty" or "p", wherein $d\text{-}i_{Outer} = DA_{Max} + p$. In P-O lens module 130, p may be about 1 mm<p<7.5 mm.

For achieving a compact and still good performance POC that has some $d\text{-}i_{Outer}$, it is beneficial to minimize penalty p, as this maximizes $DA_{Max}$, which in turn maximizes the amount of light that can enter the POC and contribute to a POC signal. p is given by spring diameter $d_{spring}$ plus some air gap "g" of typically g=0.05 mm-0.75 mm, i.e. $p = d_{spring} + g$. p is caused by incorporating springs 142, 144 and 146 between outer part 132 and the lens barrel. Springs 142, 144 and 146 are "closed" springs as known in the art. In the following we refer to the actuation provided by P-O lens module 130 as "spring actuation".

FIG. 1F shows a known example of a known closed spring 160 in perspective and top views. Its shape is referred to as "closed" spring, since in a top view it resembles a closed circle. Top views are views in a direction normal to the XY plane. Closed spring 160 has a spring diameter "$d_{spring}$".

FIG. 1G shows another known P-O lens module numbered 170 in a top view. In lens module 170, all entities and their markings have similar meanings to those in lens module 130. P-O lens module 170 may be used in a POC such as POC 110. P-O lens module 170 includes an outer part 172, an inner part 174, a gap ("G") between inner part 172 and outer part 174, an actuator 176 and a P-O lens (not shown). The width of G varies along the diameter of outer part 172 and inner part 174, with maximum G width marked "$W_{G\text{-}Max}$". Actuator 176 is operational to move outer part 172 and an inner part 174 relative to each other along a P-O lens optical axis 178 for switching a POC including P-O lens module 170 from a P-O state to a collapsed state and vice versa. P-O lens optical axis 178 is oriented perpendicular to the x-y-axis as defined by the coordinate system shown. Actuator 176 includes two springs 180 and 182. Springs 180 and 182 are "closed" springs. When switching the POC including P-O lens module 170 from a P-O state to a collapsed state and vice versa, springs 180 and 182 provide an actuation force of actuator 176.

FIG. 1H shows schematically a known POC numbered 190 disclosed in FIGS. 18A-B of co-owned international patent application PCT/IB2022/052194 in collapsed state in a cross-sectional view. POC 190 includes a P-O assembly 122 which comprises at least one permanent magnet 192 fixed to lens barrel 112 and a ferromagnetic yoke 194 fixed to the carrier 114. P-O assembly 122 represents a magnetic spring assembly. P-O assembly 122 provides magnetic forces applied on yoke 194 by permanent magnet 192 to produce a vertical biasing force on the lens barrel 112 in the manner of a spring. Therefore, in the following we refer to the actuation provided by P-O assembly 122 as "magnetic spring actuation". In a P-O state and in cooperation with a coil (not shown), yoke 194 and magnet 192 provide a force for performing focusing.

It would be beneficial to have (1) a POC using spring actuation including compact springs, i.e. springs that have a small spring diameter (or spring width) so that they cause only a small penalty p and (2) a POC using magnetic spring actuation have a magnetic spring that exercises a magnetic spring force which is defined not solely by a strength of the magnet and the yoke which are also operational for focusing. Such springs and their incorporation in POC are disclosed herein.

SUMMARY

In various exemplary embodiments there is disclosed a pop-out lens module, comprising: an inner part; an outer part having an outer part diameter $d_o$; a gap between the inner part and outer part having a maximum gap width $W_{G\text{-}Max}$; a moving lens group fixedly coupled to the inner part, the moving lens group including a plurality of N lens elements and having an optical axis, wherein a maximum lens element diameter of all the moving lens elements is $DA_{Max}$; and an actuator that includes an open spring located in the gap, wherein the open spring is operative to move the inner part relative to the outer part in a first direction parallel to the optical axis to a pop-out state when no external forces are applied, wherein the inner part can move relative to the outer part in a second direction opposite to the first direction to a collapsed state under an external force, wherein $d_o = DA_{Max} + $ a penalty p, wherein p fulfills 0.5 mm<p<2.5 mm, and wherein 3 mm<$DA_{Max}$<15 mm.

In some examples, 0.5 mm<p<2 mm. In some examples, 0.5 mm<p<1.5 mm. In some examples, 0.5 mm<p<1 mm. In some examples, 5 mm<DA<12.5 mm. In some examples, 5 mm<DA<10 mm.

In some examples, the open spring has an open spring length $L_{Spring}$, and $L_{Spring} > W_{G-Max}$.

In some examples, the open spring is 1-folded. In some examples, the open spring is 7-folded. In some examples, the open spring is straight. In some examples, the open spring is curved. In some examples, the open spring is tapered. In some examples, the open spring is angled.

In some examples, the open spring has 2-6 serpentines. In some examples, the open spring has 2-4 windings.

In some examples, 1 mm $\leq L_{Spring} \leq$ 15 mm. In some examples, 4 mm $\leq L_{Spring} \leq$ 8 mm.

In some examples, the open spring has an open spring width $W_{Spring}$, and 0.1 mm $\leq W_{Spring} \leq$ 1 mm. In some examples, 0.15 mm $\leq W_{Spring} \leq$ 0.5 mm.

In some examples, the open spring has an open spring height in a collapsed state c-$H_{Spring}$ and an open spring height in a pop-out state $H_{Spring}$, and the ratio c-$H_{Spring}$/$H_{Spring}$ fulfills $1/4 \leq$ c-$H_{Spring}$/$H_{Spring} \leq 3/4$.

In some examples, the open spring has an open spring height in a collapsed state c-$H_{Spring}$ and an open spring height in a pop-out state $H_{Spring}$, wherein 1 mm $\leq$ c-$H_{Spring} \leq$ 15 mm, and wherein 1 mm $\leq H_{Spring} \leq$ 20 mm. In some examples, 1 mm $\leq$ c-$H_{Spring} \leq$ 10 mm and 1 mm $\leq H_{Spring} \leq$ 15 mm. In some examples, 1 mm $\leq$ c-$H_{Spring} \leq$ 8 mm and 1 mm $\leq H_{Spring} \leq$ 12 mm.

In some examples, the pop-out lens module includes a kinematic coupling mechanism that provides mechanical accuracy and repeatability to the movement of the inner part relative to the outer part.

In some examples, the kinematic coupling mechanism includes one or more pin-groove mechanisms. In some examples, the kinematic coupling mechanism includes three pin-groove mechanisms.

In various exemplary embodiments there is provided a pop-out camera having an operative pop-out state and a collapsed state, comprising: an image sensor having an image sensor diagonal (SD); a lens including a plurality of N lens elements and comprising a moving lens group arranged along a lens optical axis and including M<N lens elements; a lens barrel containing the moving lens group; a carrier configured to receive the lens barrel, the lens barrel axially movable relative to the carrier; a magnetic spring assembly comprising at least two permanent magnets, a first permanent magnet being fixedly coupled to the lens barrel, a second permanent magnet, and a ferromagnetic yoke fixedly coupled to the carrier, wherein the magnetic spring assembly is configured to cause the lens barrel to move axially relative to the carrier along a first direction along the lens optical axis from the collapsed state towards an operative state, and wherein the image sensor is configured to image a field of view of the lens when the lens barrel is in the operative state.

In some examples, the second permanent magnet is fixedly coupled to the carrier, the first permanent magnet is divided into a top half and a bottom half, both the top half and the bottom half have a magnetization that is perpendicular to the first direction, and the magnetization of the bottom half is anti-parallel to the magnetization of the top half.

In some examples, the second permanent magnet has a magnetization perpendicular to the first direction. In some examples, a magnetization vector of the second permanent magnet is parallel to a magnetization vector of the bottom half of the first permanent magnet. In some examples, the first permanent magnet has a magnetization parallel to the first direction, and a magnetization vector points towards the image sensor.

In some examples, the second permanent magnet is fixedly coupled to the carrier and has a magnetization parallel to the first direction, wherein a magnetization vector points away from the image sensor. In some examples, the magnetic spring assembly comprises three permanent magnets, and the third permanent magnet is fixedly coupled to the lens barrel. In some examples, the third permanent magnet has a magnetization parallel to the first direction, and a magnetization vector points towards the image sensor. In some examples, the second permanent magnet has a magnetization perpendicular to the first direction, and a magnetization vector points towards the lens barrel. In some examples, the second permanent magnet has a magnetization parallel to the first direction, and a magnetization vector points away from the image sensor.

In some examples, the pop-out camera has a total track length TTL in an active state and a collapsed total track length cTTL in an inactive state, and cTTL/TTL<0.9. In some examples, cTTL/TTL<0.8. In some examples, cTTL/TTL<0.75. In some examples, CTTL/TTL<0.7.

In some examples, the lens is formed by the moving lens group. In some examples, the lens is moved along the optical axis for focusing. In some examples, the lens is formed by the moving lens group fixedly coupled to the inner part and a non-moving lens group fixedly coupled to the outer part.

In some examples, the pop-out camera is a Wide camera including a Wide camera image sensor having a sensor diagonal SD in the range of 12-30 mm, wherein the Wide camera has an effective focal length EFL in the range of 5-20 mm, and wherein cTTL/SD<0.8. In some examples, cTTL/SD<0.75. In some examples, cTTL/SD<0.7. In some examples, cTTL/SD<0.65. In some examples, cTTL/SD<0.6.

In some examples, the pop-out camera includes a retractable cover window that pushes on the inner part to bring the pop-out camera to the collapsed state.

In some examples, the pop-out camera is a Tele camera having an effective focal length EFL in the range of 10-30 mm, and a ratio cTTL/EFL<0.8. In some examples, cTTL/EFL<0.75. In some examples, cTTL/EFL<0.7. In some examples, cTTL/EFL<0.65. In some examples, cTTL/EFL<0.6.

In some examples, the pop-out camera is included in a mobile device. In some examples, the mobile device is a smartphone.

In some examples, the pop-out camera is included in a multi-camera together with at least one additional camera.

In some examples, the pop-out lens module is moved perpendicular to the optical axis for optical image stabilization.

In some examples, pop-out camera including an image sensor that is moved perpendicular to the optical axis for optical image stabilization.

BRIEF DESCRIPTION OF THE DRAWINGS

Non-limiting embodiments of the presently disclosed subject matter are described below with reference to figures attached hereto that are listed following this paragraph. Identical structures, elements or parts that appear in more than one figure may be labeled with the same numeral in the figures in which they appear. The drawings and descriptions are meant to illuminate and clarify examples disclosed herein, and should not be considered limiting in any way.

FIG. 1A shows exemplarily a known example of a mobile device including a pop-out camera in a collapsed state in a perspective view;

FIG. 1B shows exemplarily a known example of a mobile device including a pop-out camera in a pop-out or active state in a perspective view;

FIG. 1C shows schematically a known pop-out camera in a collapsed state in a cross-sectional view;

FIG. 1D shows schematically the known pop-out camera of FIG. 1C in an extended state;

FIG. 1E shows a known example of a pop-out lens module in a top view;

FIG. 1F shows a known example of a closed spring in perspective and top views;

FIG. 1G shows another known example of a pop-out lens module in a top view;

FIG. 1H shows another known example of a pop-out camera in a cross-sectional view;

DETAILED DESCRIPTION

Figure 2A:
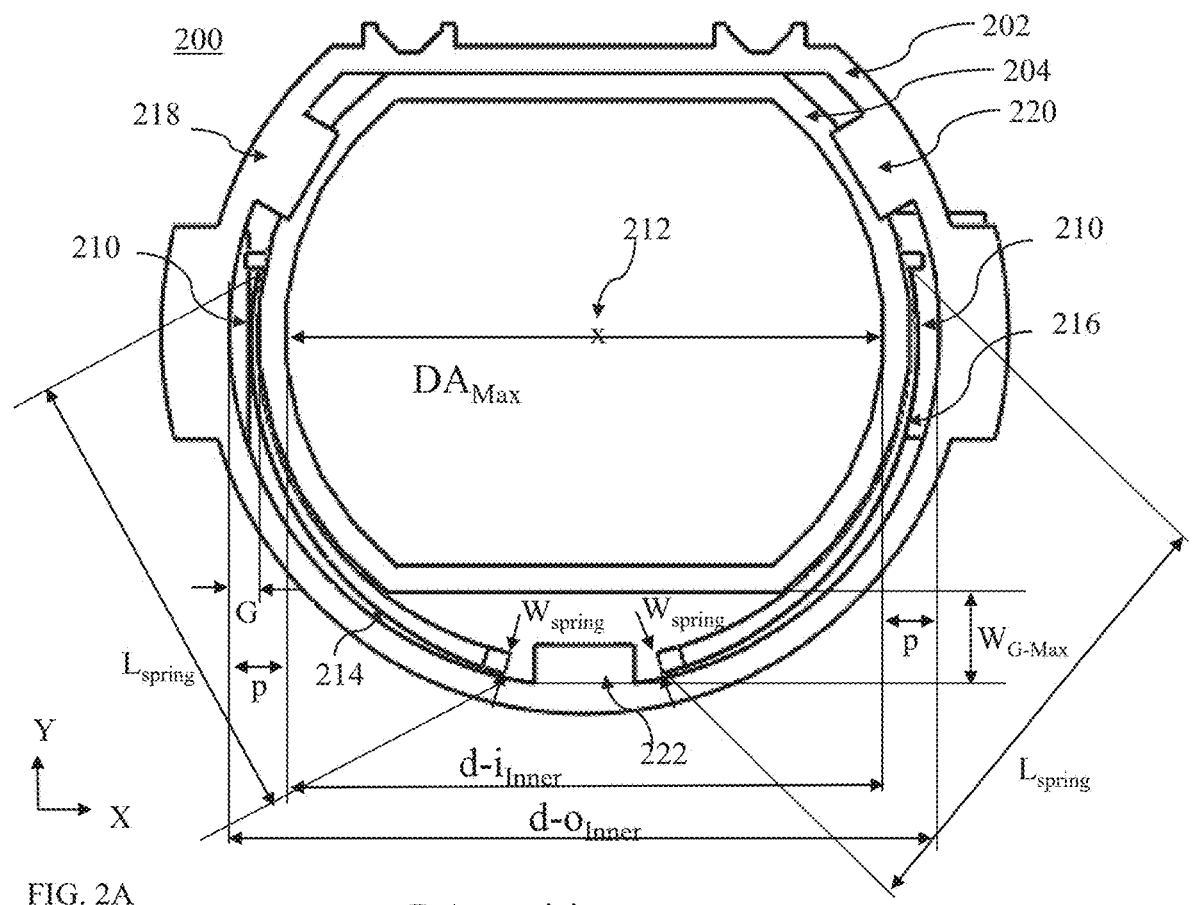
FIG. 2A shows an example of a pop-out lens module disclosed herein in a top view.

FIG. 2A shows a pop-out lens module numbered 200 disclosed herein in a top view. P-O lens module 200 is operational to be used in a pop-out camera such as POC 110. P-O lens module 200 includes an outer part 202 separated by a gap G from an inner part 204, an actuator 210 and a P-O lens (not shown). Actuator 210 is operational to move outer part 202 and inner part 204 relative to each other along a P-O lens optical axis 212 for switching the POC (and lens) from a P-O (operational) state to a collapsed state and vice versa. P-O lens optical axis 212 is oriented perpendicular to the X and Y axes (i.e. is along a Z-axis) the coordinate system shown. Actuator 210 includes two springs 214 and 216 and three pin-groove mechanisms 218, 220 and 222. Together, mechanisms 218, 220 and 222 form a kinematic coupling mechanism between outer part 202 and inner part 204. When switching the camera (and lens) from the P-O state to the collapsed state and vice versa, springs 214 and 216 provide an actuation force, and the kinematic coupling mechanism provides mechanical accuracy and repeatability for actuator 210. Springs 214 and 216 are located within gap G between outer part 202 and inner part 204. The width of gap G varies along the diameter of outer part 202 and inner part 204, with a maximum G width marked "$W_{G-Max}$". $W_{G-Max}$ may be in the range of 0.25-5 mm.

Each of springs 214 and 216 has a spring length "$L_{Spring}$" and a spring width "$W_{Spring}$". $L_{Spring}$ may fulfill 1 mm<$L_{Spring}$<15 mm, or, beneficially, may fulfill 4 mm<$L_{Spring}$<8 mm. $W_{Spring}$ may fulfill 0.1 mm<$W_{Spring}$<1 mm, or, beneficially, may fulfill 0.15 mm<$W_{Spring}$<0.5 mm. Outer part 202 has an inner diameter ("d-$o_{Inner}$") and inner part 204 has a maximum inner diameter ("d-$i_{Inner}$"). D-$i_{Inner}$ is limited by width $W_{Spring}$ of springs 214 and 216 and it represents a maximum aperture diameter ("$DA_{Max}$", as marked) of the P-O lens included in P-O lens module 200, i.e. $DA_{Max}$=d-$i_{Inner}$, as shown.

Note that the P-O lens (not shown here) may have a plurality N of lens elements, which in some examples may be divided into two or more lens groups, as disclosed for example in co-owned international patent applications PCT/IB2020/058697, PCT/IB2021/057311, PCT/IB2022/050575, PCT/IB2021/056358, PCT/IB2022/052194, PCT/IB2022/050594 and PCT/IB2022/056646.

d-$o_{Inner}$=$DA_{Max}$+p. In P-O lens module 200, p may fulfill 0.25 mm<p<5 mm, preferably 0.25 mm<p<2.5 mm, or even 0.25 mm<p<1 mm. As discussed, it is beneficial to minimize penalty p, as this maximizes $DA_{Max}$. The abovementioned p ranges in lens module 200 are much smaller than in the known art modules.

$DA_{Max}$ refers only to lens elements of a moving lens group. A "moving lens group" is a lens group that moves together with inner part 204, e.g. a lens group fixedly coupled to inner part 204. In other words, a moving lens group is a lens group that moves relative to an image sensor included in a POC when the POC is switched between the P-O state and the collapsed state. $DA_{Max}$ may be in the range 3 mm<$DA_{Max}$<15 mm. In some examples, 5 mm<$DA_{Max}$<12.5 mm or 5 mm<$DA_{Max}$<10 mm. p is given by spring width $W_{Spring}$ plus some air gap "a-g", i.e. p=$d_{Spring}$+a-g. a-g may be for example about 0.05-0.75 mm. p is caused by incorporating springs 214 and 216 between outer part 202 and inner part 204. Springs 214 and 216 may be for example springs 300, 400, 500, 600, 700 or 800, see FIGS. 3-8. These springs are referred to as "open" springs, since in a top view their shape exhibits two open ends. An advantage of an open spring over a closed spring (as e.g. in FIG. 1F) is its relatively small spring width $W_{Spring}$ when compared to the diameter $d_{Spring}$ of the closed spring. Therefore, an open spring allows for a smaller penalty p when compared to a closed spring. Therefore, P-O lens module 200 as well as open springs 300, 400, 500, 600, 700, and 800 disclosed herein are beneficial for use in a modern mobile device such as a smartphone.

In some embodiments, P-O lens module 200 is moved for optical image stabilization ("OIS") perpendicular to P-O lens optical axis 212, i.e. in an x-direction and/or a y-direction. The movement of P-O lens module 200 is relative to the image sensor. In other embodiments, the image sensor may be moved perpendicular to P-O lens optical axis 212 and relative to P-O lens module 200 for OIS.

Figure 2B:
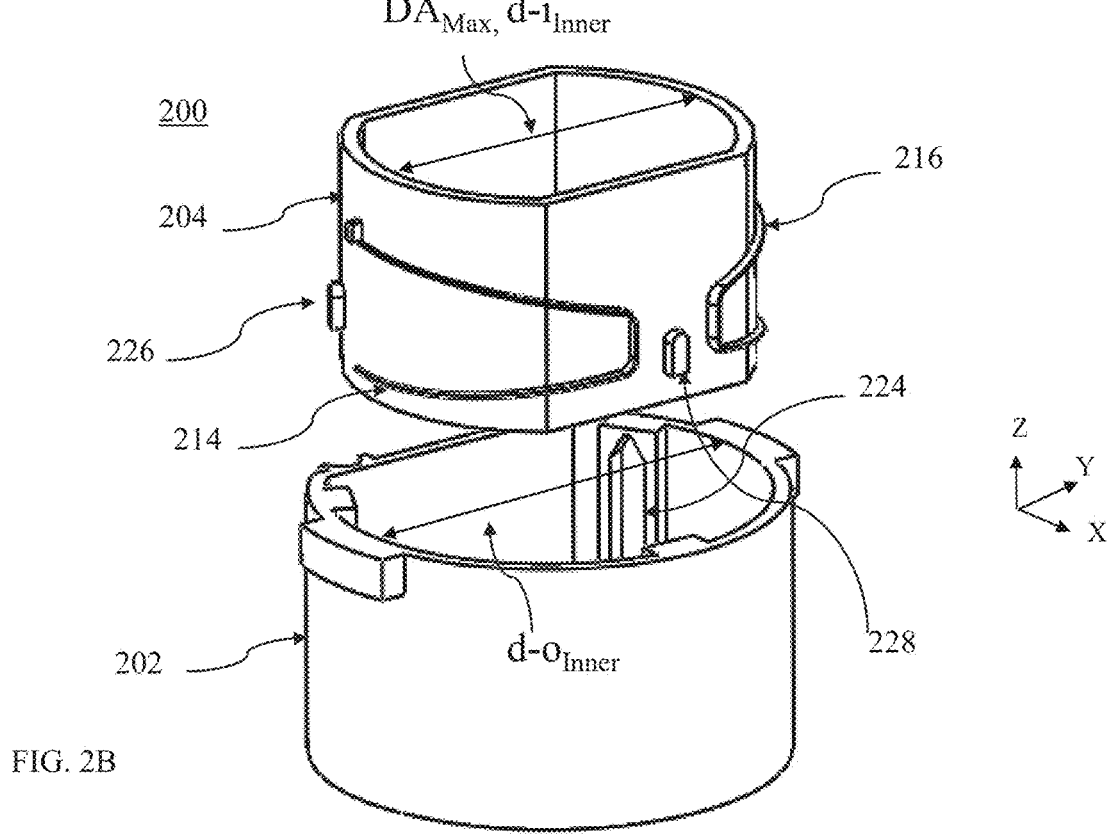
FIG. 2B shows the example of a pop-out lens module of FIG. 2A in a perspective view.

FIG. 2B shows P-O lens module 200 of FIG. 2A in a perspective exploded view. Open springs 214 and 216 are visible. Groove 224 of pin-groove mechanism 220, pin 226 of pin-groove mechanism 218 and pin 228 of pin-groove mechanism 220 are visible as well.

Figure 3A:
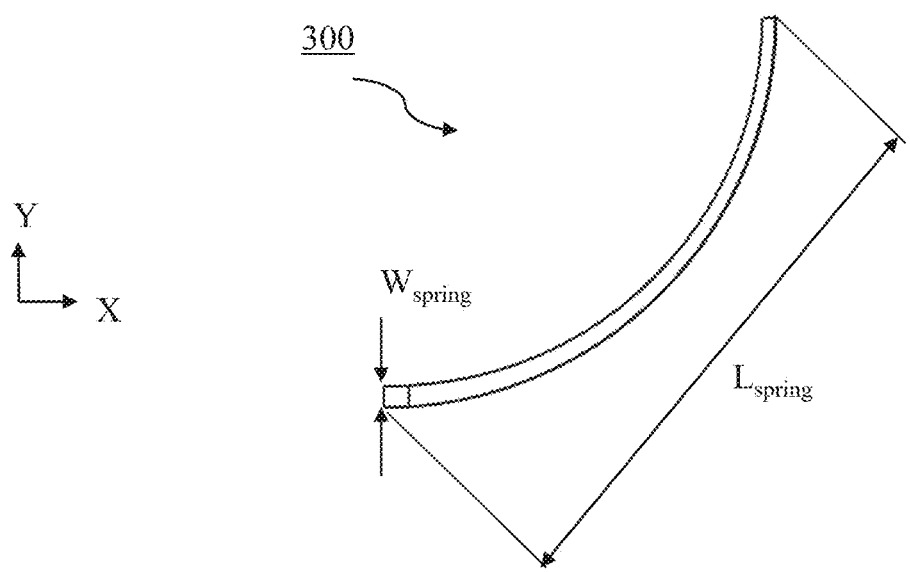
FIG. 3A shows an example of a 1-folded curved open spring disclosed herein in a top view.
Figure 3B:
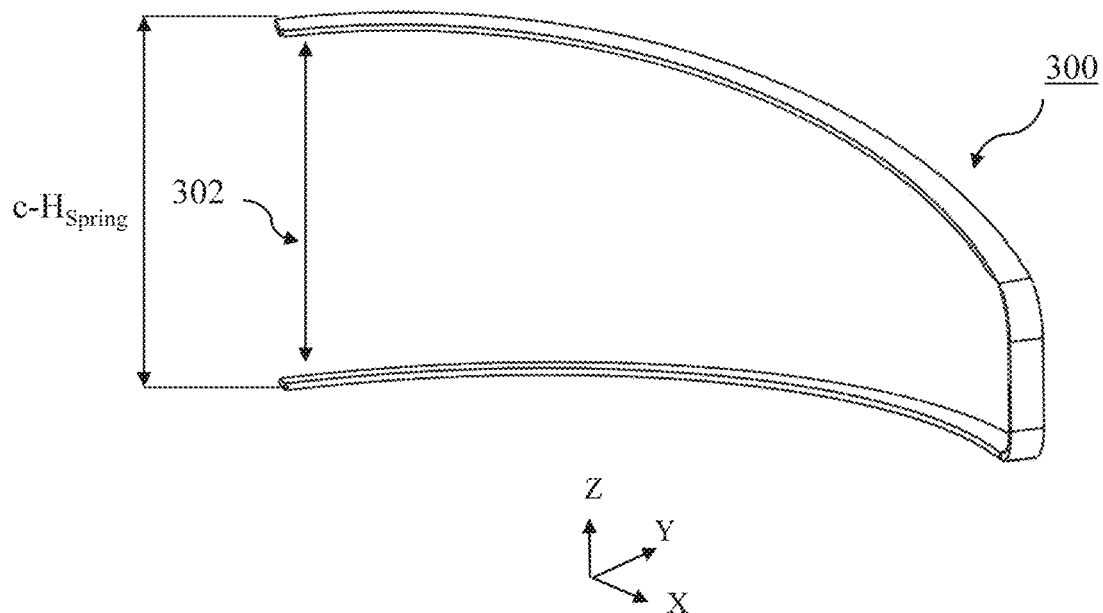
FIG. 3B shows the example of the 1-folded curved open spring of FIG. 3A in a perspective view.

FIG. 3A shows a first example of an open spring numbered 300 disclosed herein in a top view. FIG. 3B shows open spring 300 of FIG. 3A in a perspective view. A working direction (parallel to the Z-axis) along which spring 300 exercises a force is indicated by arrow 302. Spring 300 is shown in a collapsed state. Spring 300 is a "1-folded curved open spring". $L_{Spring}$ may fulfill 1 mm<$L_{Spring}$<15 mm, $W_{Spring}$ may fulfill 0.1 mm<$W_{Spring}$<1 mm, and c-$H_{Spring}$ may fulfill 1 mm<c-$H_{Spring}$<15 mm. "Curved" refers to spring 300's shape in a top view, and "1-folded" refers to the number of foldings (here 1) of spring 300 in a direction perpendicular to its working direction.

An advantage of a 1-folded open spring is that it does not suffer from buckling, which is an undesired sudden change in a shape of a structural component under load.

Open spring 300 is operational to be used in a P-O lens module such as P-O lens module 200. This is also the case for all other open spring examples disclosed herein, i.e. all springs 300, 400, 500, 600, 700 and 800 are operational to be used in such a P-O lens module. In a P-O module including open spring 300, the working direction of open spring 300 is oriented parallel to an optical axis (such as optical axis 212, see FIG. 2A) of a lens included in the P-O module. This is also the case for all other open spring examples disclosed herein, i.e. in a P-O module including open springs 300, 400, 500, 600, 700 or 800 respectively, the working direction of open springs 300, 400, 500, 600, 700 or 800 respectively is oriented parallel to the optical axis (e.g. 212) of the lens.

Figure 4A:
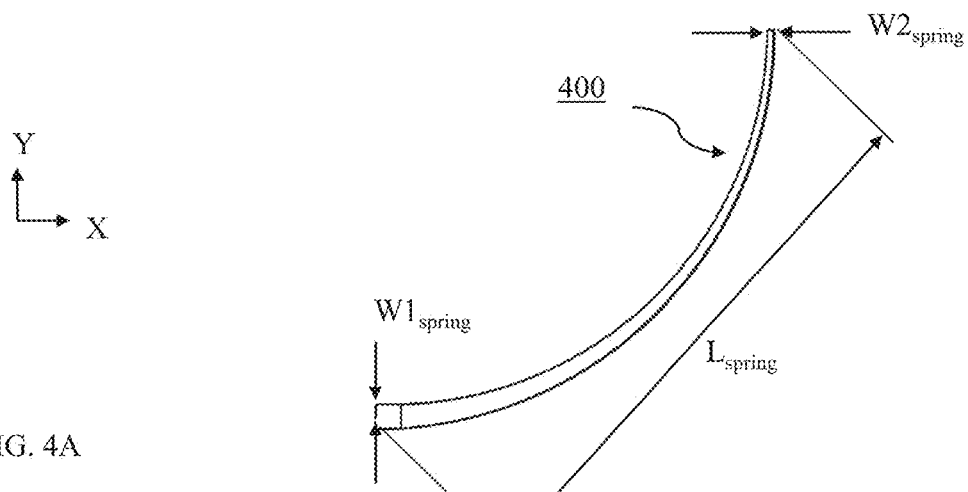
FIG. 4A shows an example of a 1-folded curved and tapered open spring disclosed herein in a top view.
Figure 4B:
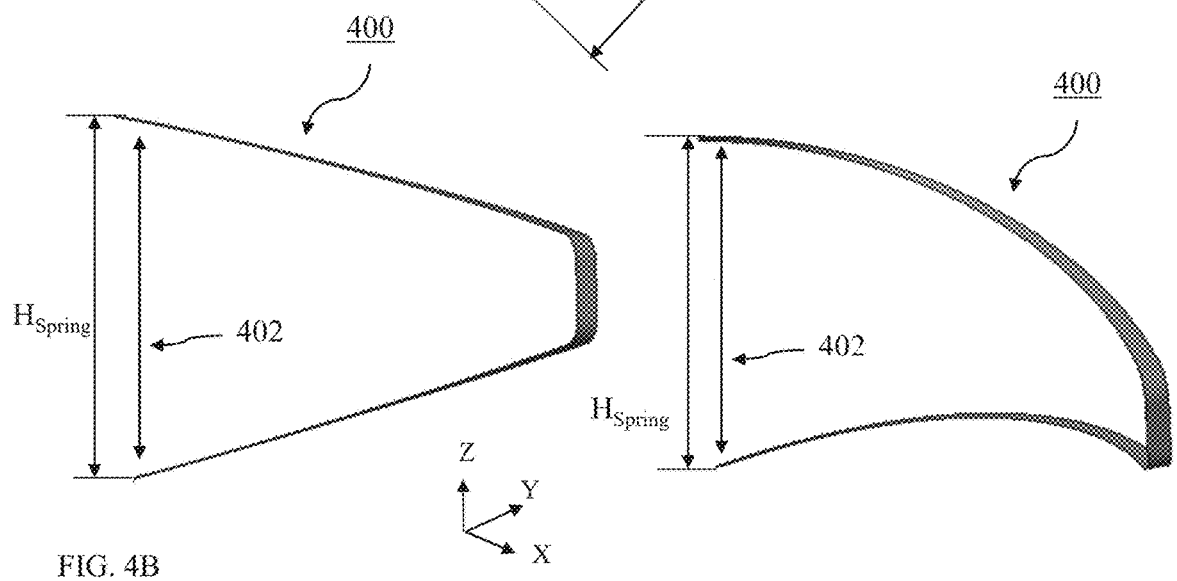
FIG. 4B shows the example of the 1-folded curved and tapered open spring of FIG. 4A in a pop-out state in a perspective view.
Figure 4C:
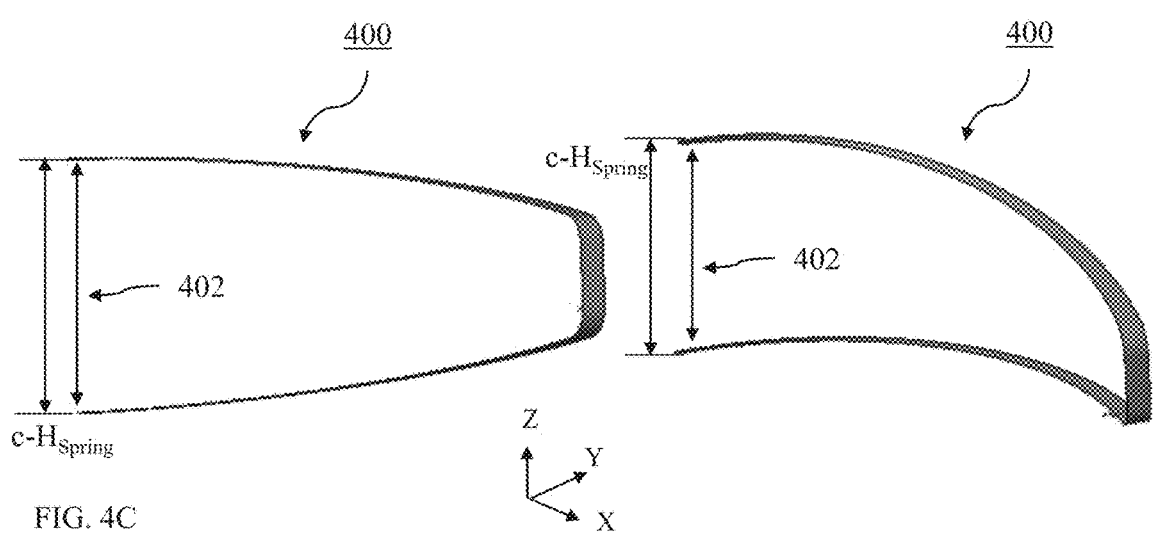
FIG. 4C shows the example of the 1-folded curved and tapered open spring of FIG. 4A in a collapsed state in a perspective view.

FIG. 4A shows a second example of an open spring numbered 400 disclosed herein in a top view. FIG. 4B shows open spring 400 of FIG. 4A in a P-O state in two different perspective views. A height of spring 400 in the P-O state $H_{Spring}$ may fulfill 2 mm<$H_{Spring}$<20 mm. A working direction along which spring 400 exercises a force is indicated by arrow 402. FIG. 4C shows open spring 400 of FIGS. 4A-B in a collapsed state in two different perspective views.

"c-$H_{Spring}$" may fulfill 1 mm<c-$H_{Spring}$<15 mm. The ratio c-$H_{Spring}$/$H_{Spring}$ may fulfill ¼<c-$H_{Spring}$/$H_{Spring}$<¾. Spring 400 is a "1-folded curved and tapered open spring" and has a spring length "$L_{Spring}$" and a continuously changing spring width as indicated by a maximum spring width "$W1_{Spring}$" and by a minimum spring width "$W2_{Spring}$", as marked. "Tapered" refers to spring 400's continuously changing spring width as seen in a top view (FIG. 4A). An advantage of a tapered open spring such as spring 400 over a non-tapered open spring such as spring 300 is that the stress that acts on the open spring is distributed more homogeneously along $L_{Spring}$, allowing for a more efficient open spring. $W2_{Spring}$ may be larger than $W1_{Spring}$/10 and smaller than $W1_{Spring}$/2. W1 Spring may be larger than 0.1 mm and smaller than 2 mm.

Figure 5A:
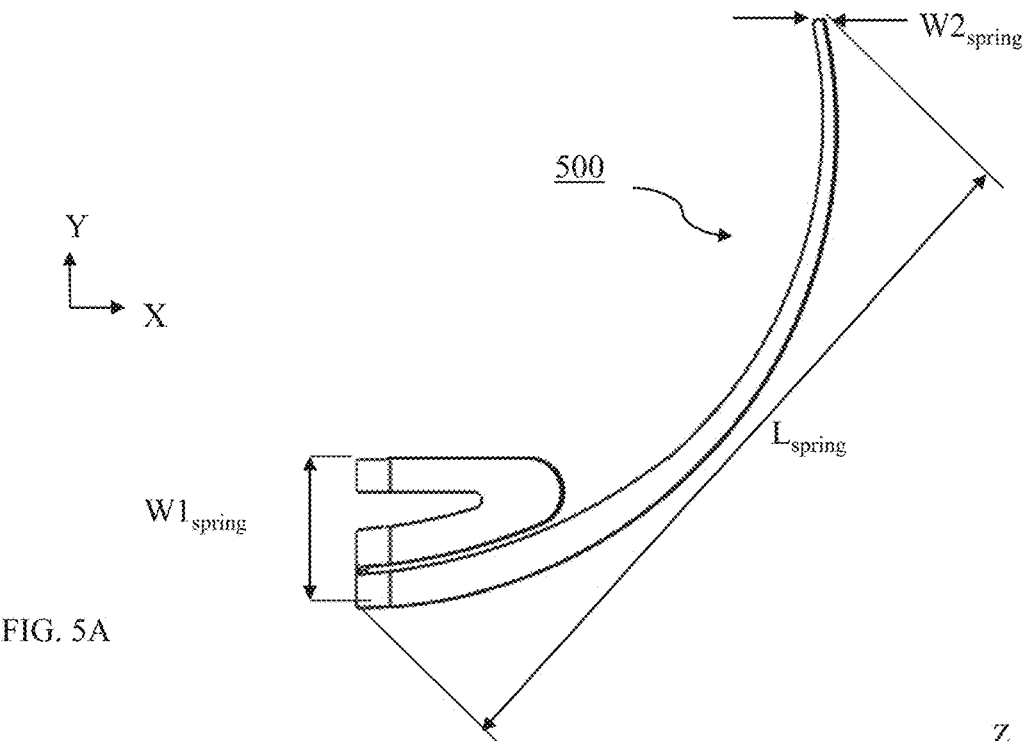
FIG. 5A shows an example of a 1-folded 2-serpentine curved and tapered open spring disclosed herein in a top view.
Figure 5B:
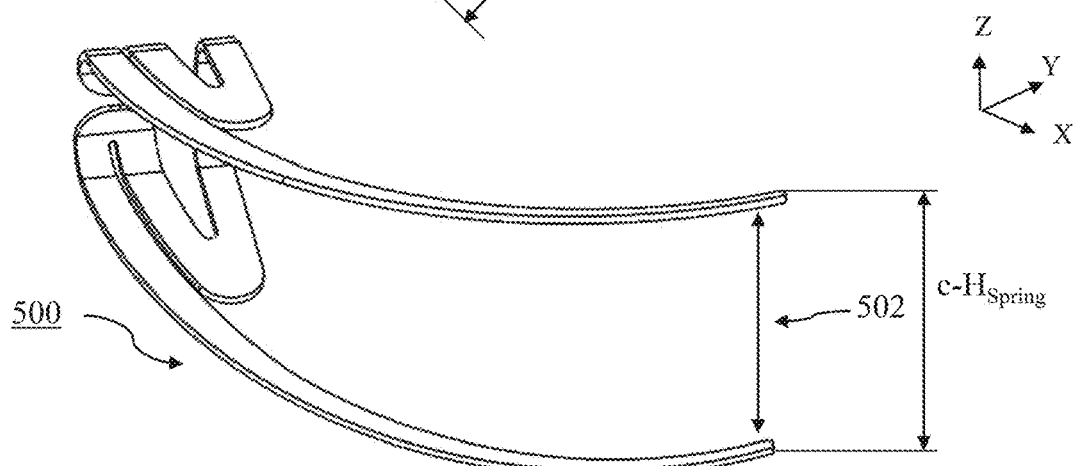
FIG. 5B shows the example of the 1-folded 2-serpentine curved and tapered open spring of FIG. 5A in a first perspective view.
Figure 5C:
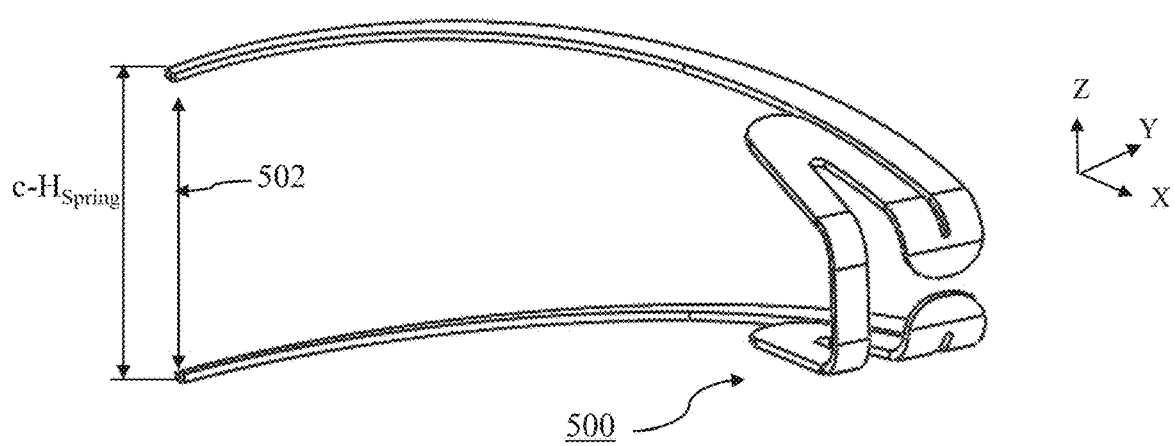
FIG. 5C shows the example of the 1-folded 2-serpentine curved and tapered open spring of FIG. 5A in a second perspective view.

FIG. 5A shows a third example of an open spring numbered 500 disclosed herein in a top view. FIG. 5B shows open spring 500 of FIG. 5A in a first perspective view. FIG. 5C shows open spring 500 of FIGS. 5A-B in a second perspective view. A working direction along which spring 500 exercises a force is indicated by arrow 502. Spring 500 is a "1-folded 2-serpentine curved and tapered open spring" and shown in a collapsed state. Spring 500 has a spring length "$L_{Spring}$", a collapsed spring height (c-$H_{Spring}$) and a continuously changing spring width as indicated by a maximum spring width "$W1_{Spring}$" and by a minimum spring width "$W2_{Spring}$", as marked. "2-serpentine" refers to spring 500's two foldings as seen in a top view (FIG. 5A). An advantage of a serpentine open spring such as spring 500 over a non-serpentine open spring such as spring 400 is that for a given $L_{Spring}$, $H_{Spring}$ and $W2_{Spring}$, a more flexible spring is achieved, i.e. a spring which allows for larger P-O strokes (i.e. differences in the ratio of $H_{Spring}$ and c-$H_{Spring}$). For example, a P-O stroke larger by 5%-50% compared to a previous open spring configuration such as e.g. spring 400 may be achieved.

Figure 6A:
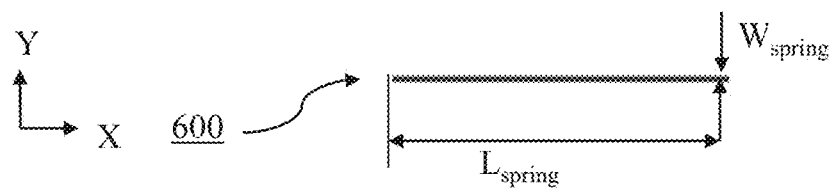
FIG. 6A shows an example of a 1-folded straight open spring disclosed herein in a top view.
Figure 6B:
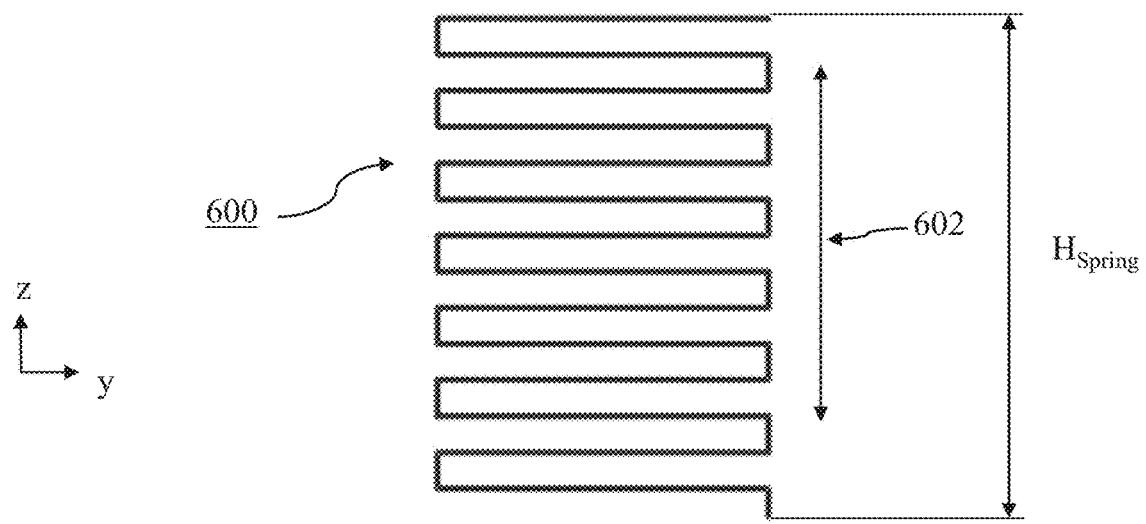
FIG. 6B shows the example of the 1-folded straight open spring of FIG. 6A in a side view.
Figure 6C:
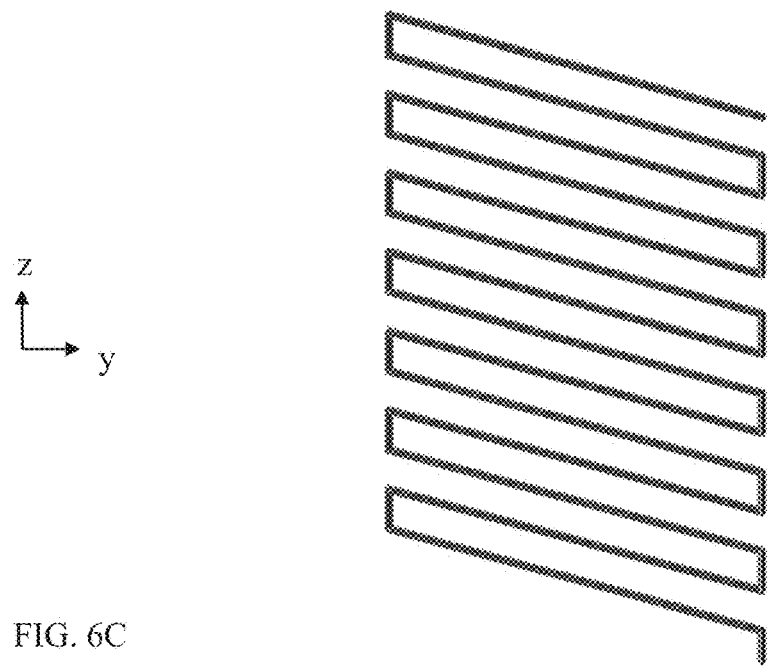
FIG. 6C shows the example of the 1-folded straight open spring of FIGS. 6A-B in a perspective view.

FIG. 6A shows a fourth example of an open spring numbered 600 disclosed herein in a top view. Open spring 600 is shown in a P-O state. FIG. 6B shows open spring 600 of FIG. 6A in a side view. FIG. 6C shows open spring 600 of FIGS. 6A-B in a perspective view. A working direction along which spring 600 exercises a force is indicated by arrow 602. Spring 600 is a "7-folded straight open spring". "7-folded" refers to spring 600's seven foldings as seen in a top view, "straight" refers to spring 600's straight shape as seen in a top view (FIG. 6A). $L_{Spring}$ may be larger than 1 mm and smaller than 15 mm, $W_{Spring}$ may be larger than 0.1 mm and smaller than 1 mm and $H_{Spring}$ may be larger than 1 mm and smaller than 20 mm.

Figure 7:
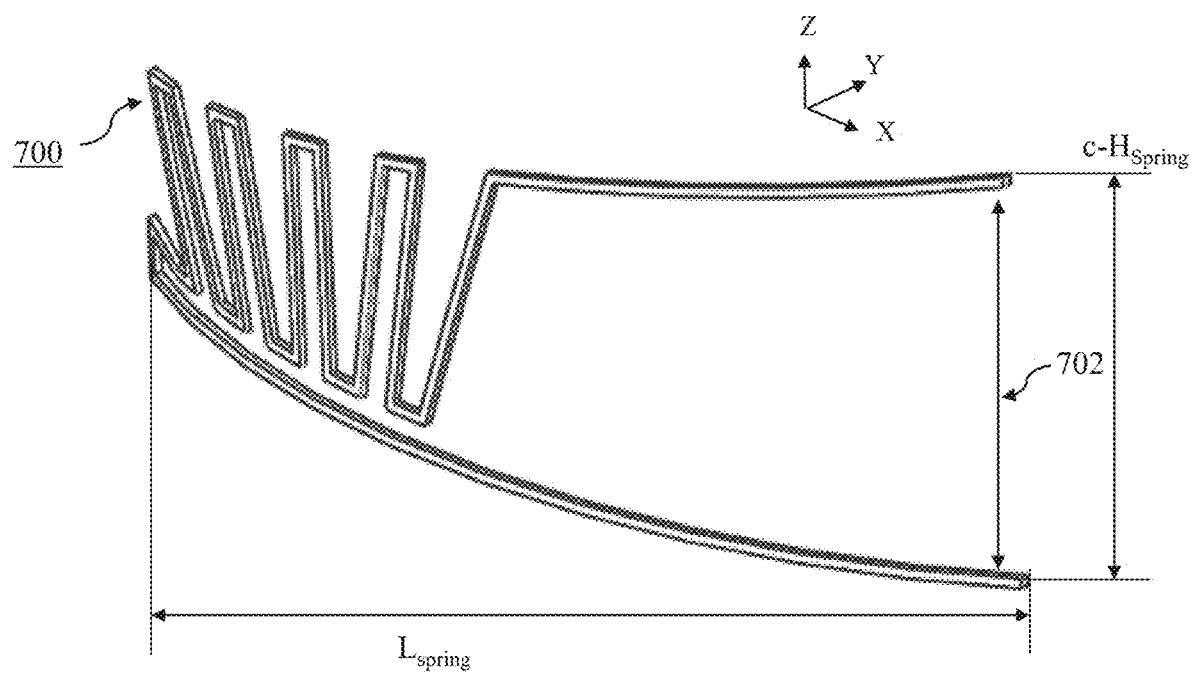
FIG. 7 shows an example of a 1-folded 4-serpentine curved open spring in a perspective view.

FIG. 7 shows a sixth example of an open spring numbered 700 disclosed herein in a perspective view. A working direction along which spring 700 exercises a force is indicated by arrow 702. Spring 700 is a "1-folded 4-serpentine curved open spring". $L_{Spring}$ may be larger than 1 mm and smaller than 15 mm and c-$H_{Spring}$ may be larger than 1 mm and smaller than 15 mm.

Figure 8:
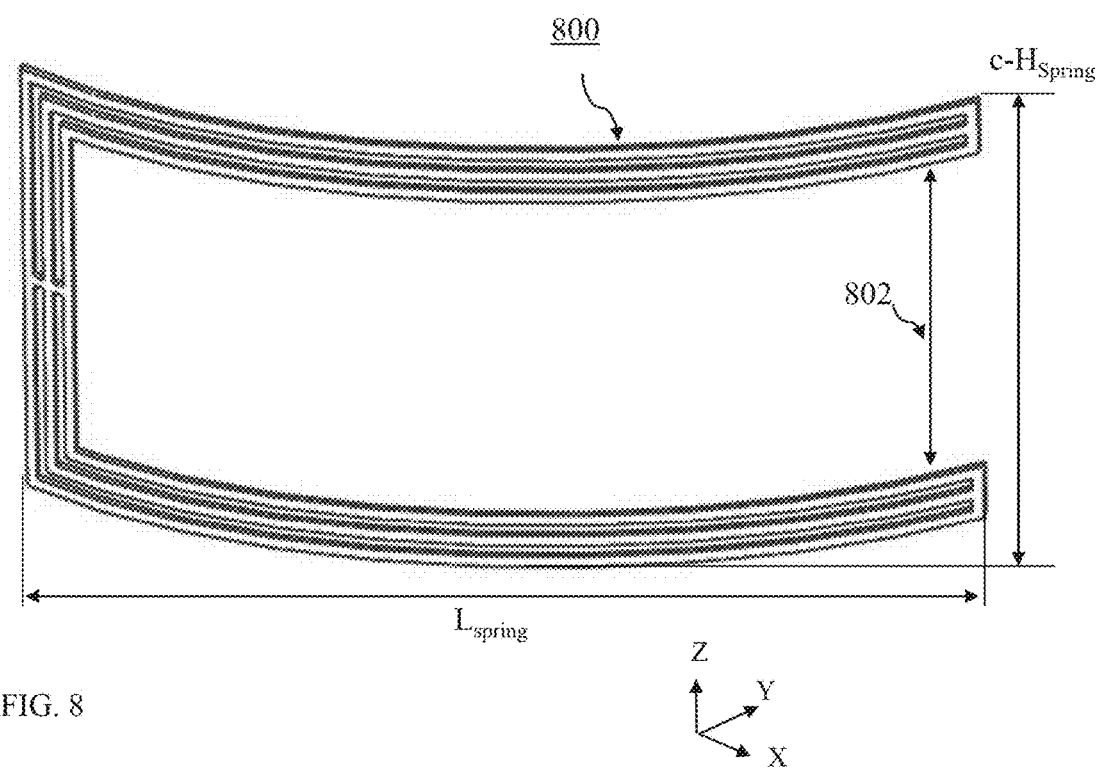
FIG. 8 shows an example of a 1-folded 3-windings curved open spring in a perspective view.

FIG. 8 shows a seventh example of an open spring numbered 800 disclosed herein in a perspective view. A working direction along which spring 800 exercises a force is indicated by arrow 802. Spring 800 is a "1-folded 3-windings curved open spring", as marked. "3-windings" refers to spring 800's number of windings with respect to an axis perpendicular to an axis along which spring 800's length $L_{Spring}$ is measured. $L_{Spring}$ may be larger than 1 mm and smaller than 15 mm and c-$H_{Spring}$ may be larger than 1 mm and smaller than 15 mm. An advantage of open spring 800 is that it is relatively simple to manufacture.

Figure 9A:
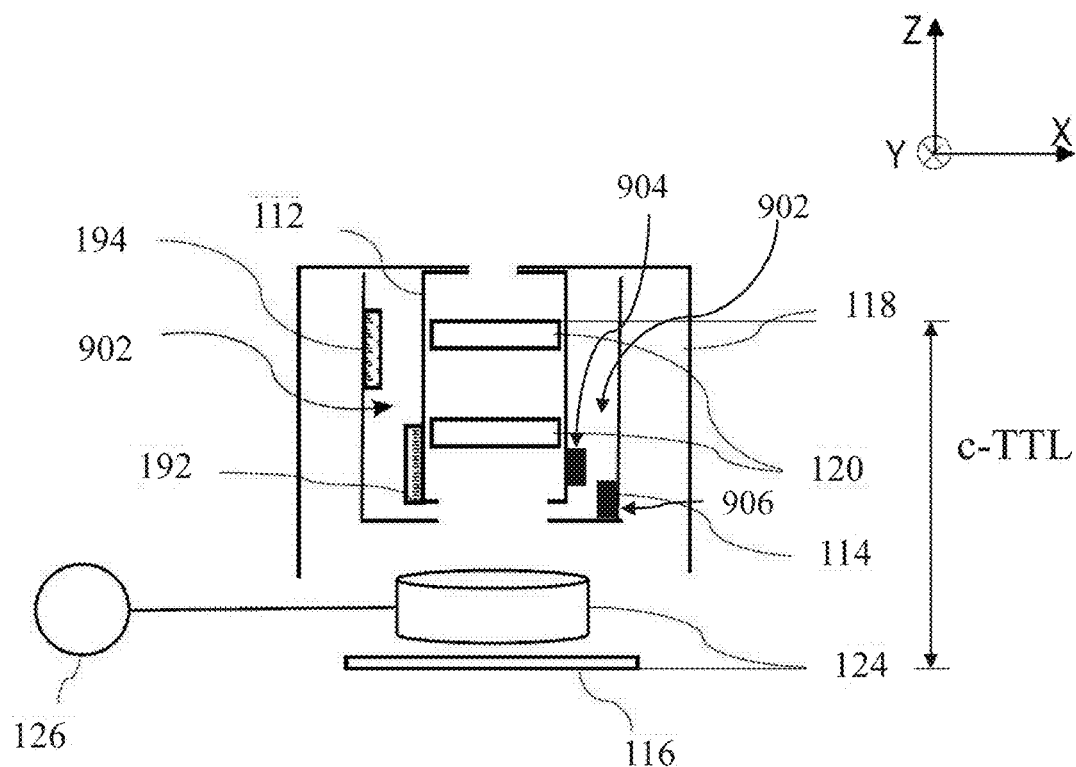
FIG. 9A shows schematically a pop-out camera including a pop-out assembly disclosed herein in a cross-sectional view in a collapsed state and in a cross-sectional view.

FIG. 9A shows schematically a POC numbered 900 including a P-O assembly 902 disclosed herein in a cross-sectional view and in a collapsed state. P-O assembly 902 is configured to controllably move lens barrel 112 from the collapsed state to the operative state and to bias lens barrel 112 in the operative state. As known P-O assembly 122 (FIG. 1G), P-O assembly 902 comprises at least a first permanent magnet 192 fixed to lens barrel 112 and a ferromagnetic yoke 194 fixed to the carrier 114. In addition, P-O assembly 902 comprises a second permanent magnet 904 fixed to lens barrel 112 and a third permanent magnet 906 fixed to coupled to carrier 114. For axial movement of lens barrel 112, second magnet 904 interacts with third magnet 906. Both second magnet 904 and third magnet 906 do not interact with magnet 192 and yoke 194. In other words, two independent forces are used to axially move lens barrel 112, a first force generated by interaction of first magnet 192 and yoke 194 and a second force generated by interaction of second magnet 904 and third magnet 906. P-O assembly 902 represents a first configuration of a "magnetic spring with repelling magnet" disclosed herein. In some examples and as shown in FIG. 9A, magnet 904 and magnet 906 are located at an opposite side of lens barrel 112 than magnet 192 and yoke 194, "opposite side" referring here to a location, or an order, along the x-axis. In other examples and with reference to magnet 192 and yoke 194, magnet 904 and magnet 906 may be located at a different side of lens barrel 112, e.g. they may be located in front of or "behind" lens barrel 112, "in front of" and "behind" referring here to a location, or an order, along the y-axis.

Figure 9B:
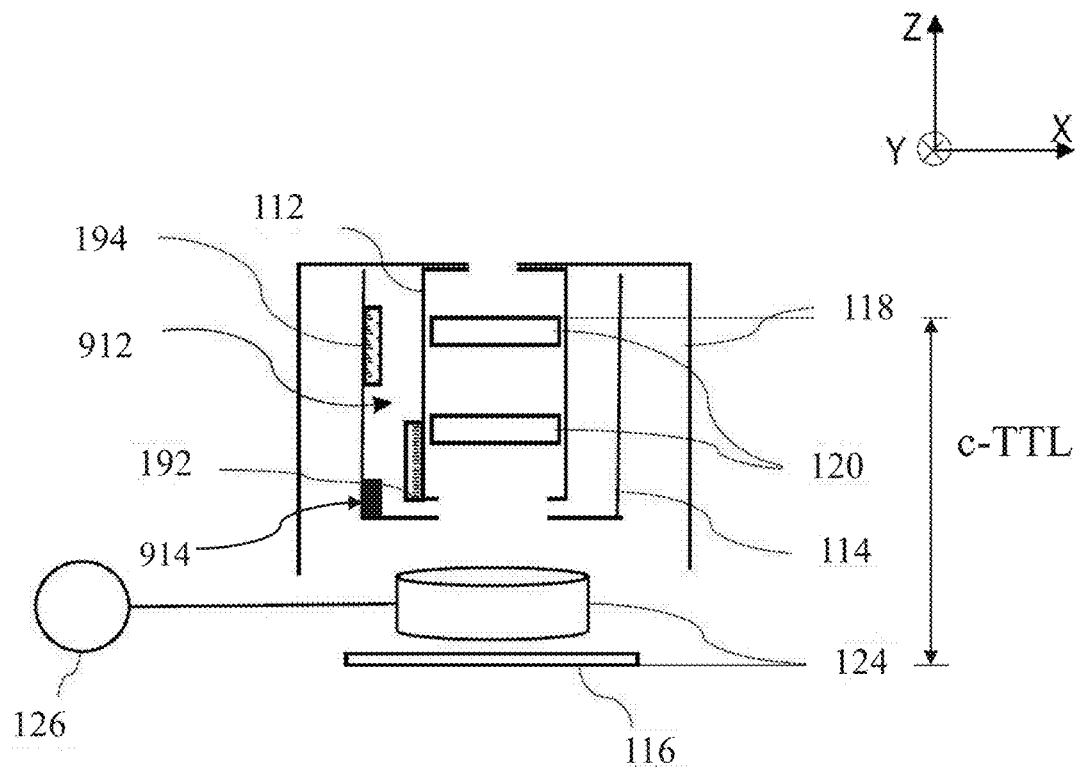
FIG. 9B shows schematically a pop-out camera including another pop-out assembly disclosed herein in a collapsed state and in a cross-sectional view.

FIG. 9B shows schematically of POC numbered 910 including a P-O assembly 912 disclosed herein in a cross-sectional view and in a collapsed state. P-O assembly 912 is configured to controllably move lens barrel 112 from the collapsed state to the operative state and to bias lens barrel 112 in the operative state. P-O assembly 912 includes a second permanent magnet 914 that is fixedly coupled to carrier 114. Magnet 914 is located at a same side of lens barrel 112 as first magnet 192 and yoke 194. "Same side" refers here to a location, or an order, along the x-axis. For axial movement of lens barrel 112, magnet 914 interacts with magnet 192. In other words, two independent forces are used to axially move lens barrel 112, a first force generated by interaction of magnet 192 and yoke 194 and a second force generated by interaction of magnet 192 and magnet 914. P-O assembly 912 represents a second configuration of a "magnetic spring with repelling magnet" disclosed herein.

For both the first and the second configuration of a "magnetic spring with repelling magnet", in a P-O state and in cooperation with a coil (not shown), yoke 194 and magnet 192 provide a force for performing focusing of POC 900 and POC 910 respectively. For focusing, lens barrel 112 is moved parallel to the z-axis, or, in other words, it is moved parallel to a lens optical axis of a lens (not shown) included in lens barrel 112. In other examples for focusing, an image sensor included in the POC is moved parallel to the z-axis and relative to lens barrel 112.

In FIGS. 9A-B, 10A-B, 11A-B, 12A-B and 13A-B, a lens optical axis of a lens (not shown) is oriented parallel to the z-axis.

Figure 10A:
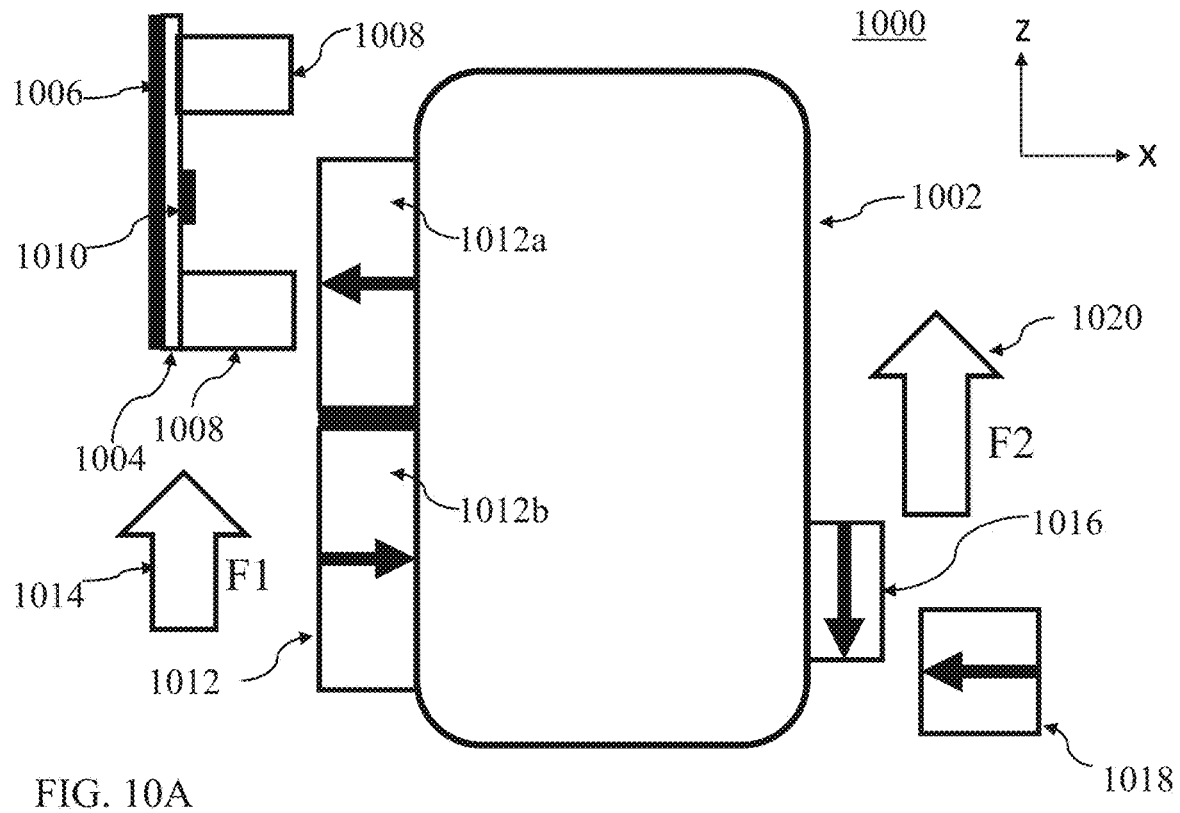
FIG. 10A shows a pop-out assembly disclosed herein in a collapsed state and in a cross-sectional view.

FIG. 10A shows a P-O assembly numbered 1000 disclosed herein in a cross-sectional view and in a collapsed state. P-O assembly 1000 represents a first example of a first configuration of a "magnetic spring with repelling magnet" (FIG. 9A). P-O assembly 1000 includes a lens barrel 1002, a first permanent magnet 1012 fixedly coupled to lens barrel 1002, a second permanent magnet 1016 fixedly coupled to lens barrel 1002, a third permanent magnet 1018 fixedly coupled to a carrier (not shown) as well as a yoke 1006 fixedly coupled to a carrier (not shown). Interaction of first magnet 1012 with yoke 1006 creates a first force ("F1") which is directed parallel to the z-axis and pointing upwards, as indicated by arrow 1014. Interaction of second magnet 1016 with third magnet 1018 creates a second force ("F2") which is directed parallel to the z-axis and pointing upwards, as indicated by arrow 1020. In the collapsed state, both F1 and F2 are relatively large, as indicated by the relatively large size (or length) of arrow 1014 and arrow 1020. In addition, P-O assembly 1000 includes a printed circuit board (PCB) 1004 and, fixedly coupled to PCB 1004, a coil 1008 and a magnetic flux sensor (e.g. a Hall bar sensor) 1010. PCB 1004 is fixedly coupled to a carrier (not shown). A magnetization (or "magnetic polarization" or "direction of the magnetic flux") of the permanent magnets is indicated by arrows within the respective permanent magnet, and namely are as follows: A top half (with respect to the z-axis) 1012a of magnet 1012 is magnetized parallel to the x-axis, with a magnetization vector pointing away from lens barrel 1002. A bottom half (with respect to the z-axis) 1012b of magnet 1012 is magnetized parallel to the x-axis, with a magnetization vector pointing towards lens barrel 1002. Second magnet 1016 is magnetized parallel to the z-axis, with a magnetization vector pointing downwards, i.e. towards an image sensor (not shown) included in a POC including P-O assembly 1000. Third magnet 1018 is magnetized parallel to the x-axis shown, with a magnetization vector pointing towards lens barrel 1002.

Figure 10B:
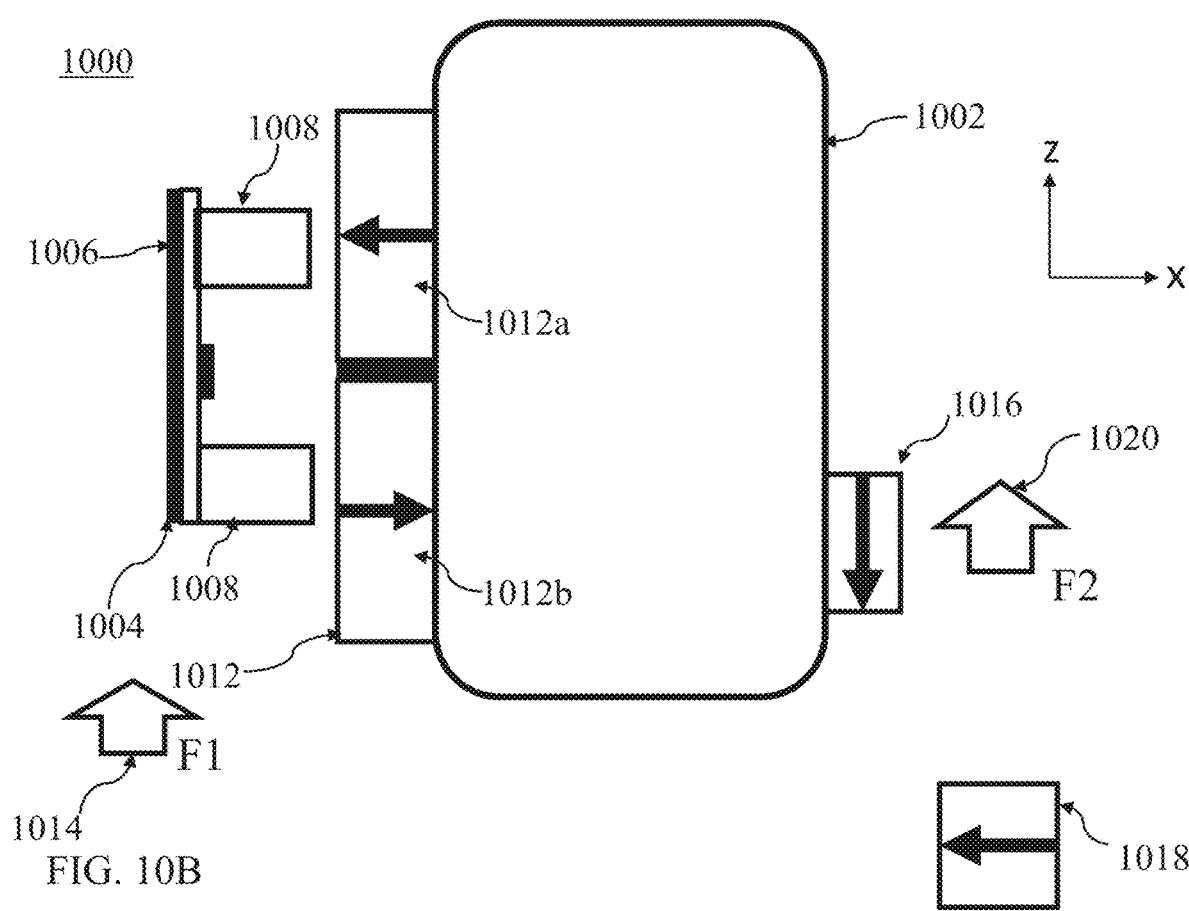
FIG. 10B shows the pop-out assembly of FIG. 10A in a pop-out state and in a cross-sectional view.

FIG. 10B shows P-O assembly 1000 in the same view as FIG. 10A in a P-O state. In the P-O state, both F1 and F2 are relatively small, as indicated by the relatively small size of arrow 1014 and arrow 1020. For F1, this is caused by the fact that first magnet 1012 and yoke 1006 are closer to an equilibrium position than in collapsed state. For F2, this is caused by the fact that second magnet 1016 and third magnet 1018 are farther away from each other than in the collapsed state.

Figure 11A:
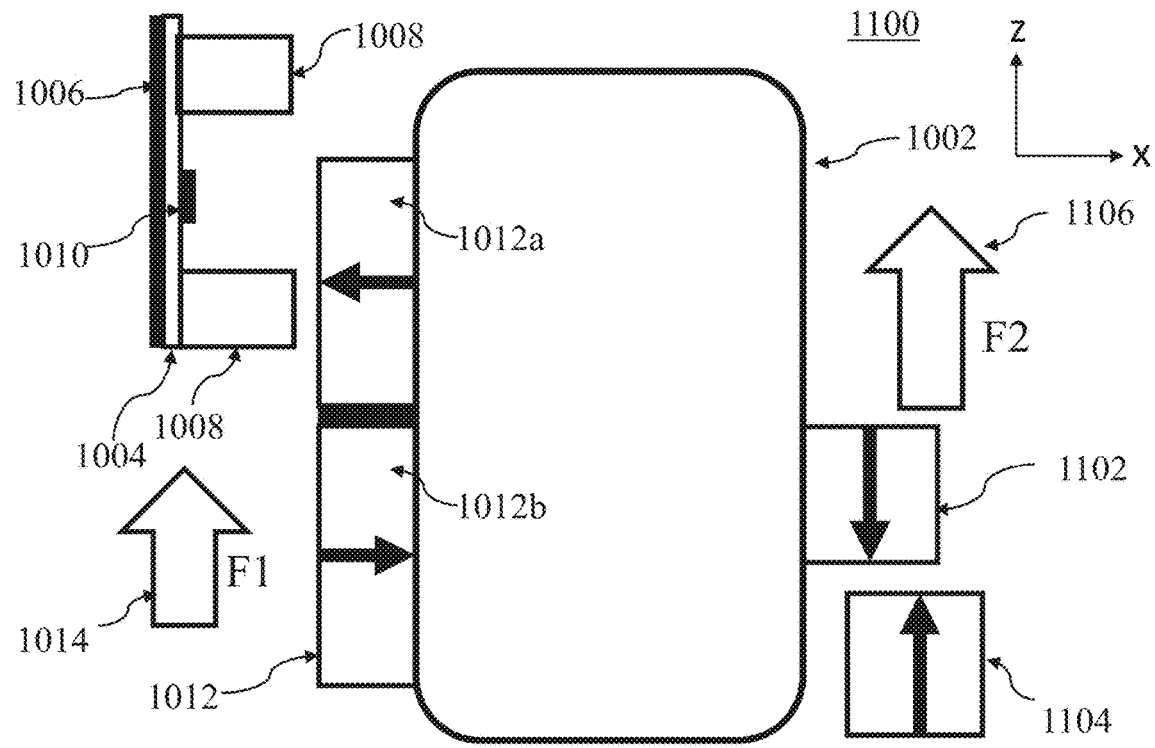
FIG. 11A shows another pop-out assembly disclosed herein in a collapsed state and in a cross-sectional view.

FIG. 11A shows a P-O assembly numbered 1100 disclosed herein in a cross-sectional view and in a collapsed state. P-O assembly 1100 represents a second example of a first configuration of a "magnetic spring with repelling magnet" (FIG. 9A). Except differences in a second permanent magnet and in a third permanent magnet, P-O assembly 1100 is identical to P-O assembly 1000. P-O assembly 1100 includes a second permanent magnet 1102 fixedly coupled to lens barrel 1002 and a third permanent magnet 1104 fixedly coupled to a carrier (not shown). Interaction of first magnet 1012 with yoke 1006 creates a first force ("F1"). Interaction of second magnet 1102 with third magnet 1104 creates a second force ("F2") which is directed parallel to the z-axis and pointing upwards, as indicated by arrow 1106. In the collapsed state, both F1 and F2 are relatively large, as indicated by the relatively large size of arrow 1014 and arrow 1106. Second magnet 1102 is magnetized parallel to the z-axis, with a magnetization vector pointing downwards, i.e. towards an image sensor (not shown). Third magnet 1104 is magnetized parallel to the z-axis, with a magnetization vector pointing upwards, as shown.

Figure 11B:
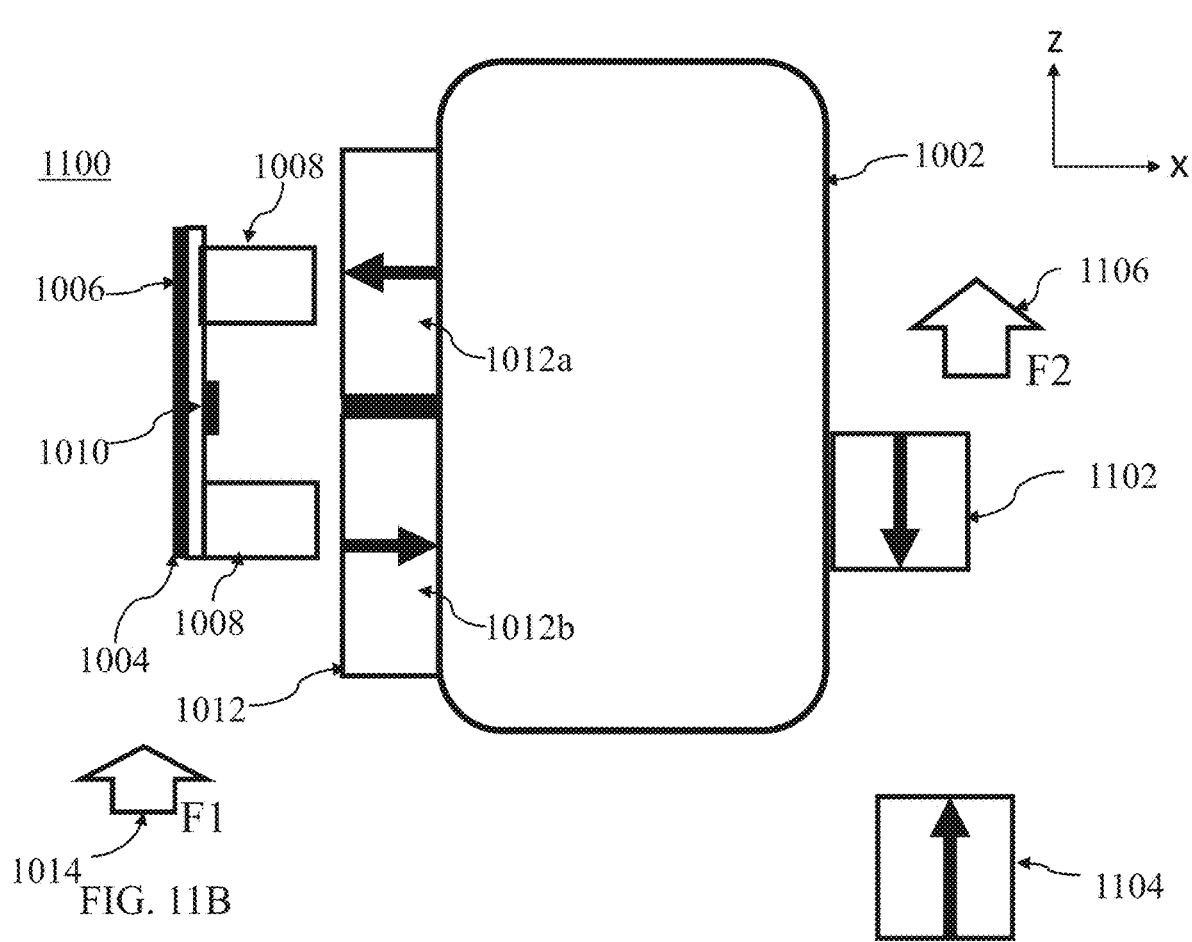
FIG. 11B shows the another pop-out assembly of FIG. 11A in a pop-out state and in a cross-sectional view.

FIG. 11B shows P-O assembly 1100 in the same view as FIG. 11A in a P-O state. In the P-O state, both F1 and F2 are relatively small, as indicated by the relatively small size of arrow 1014 and arrow 1106. For F2, this is caused by the fact that second magnet 1102 and third magnet 1104 are farther away from each other than in the collapsed state.

Figure 12A:
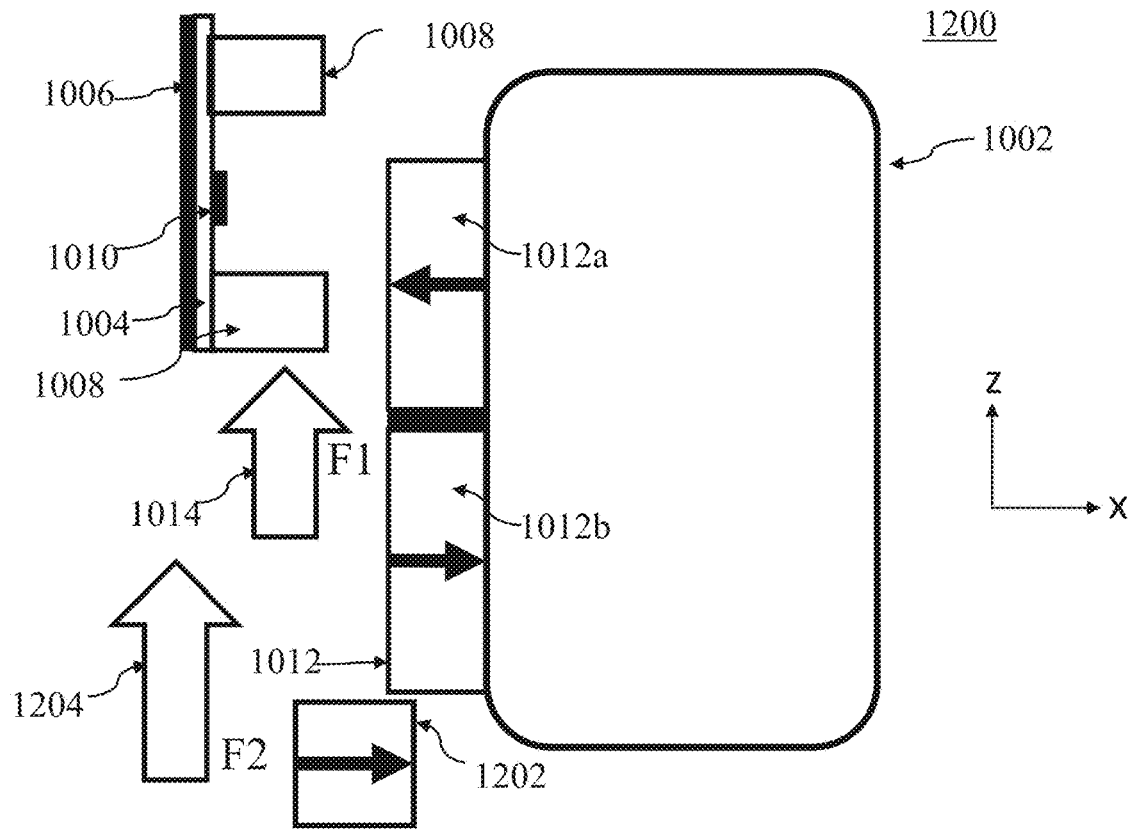
FIG. 12A shows yet another pop-out assembly disclosed herein in a collapsed state and in a cross-sectional view.

FIG. 12A shows a P-O assembly numbered 1200 disclosed herein in a cross-sectional view and in a collapsed state. P-O assembly 1200 represents a first example of a second configuration of a "magnetic spring with repelling magnet" (FIG. 9B). In addition to components described above, P-O assembly 1200 includes a second permanent magnet 1202 fixedly coupled to a carrier (not shown). Interaction of second magnet 1202 with first magnet 1012 creates a second force ("F2") which is directed parallel to the z-axis and pointing upwards, as indicated by arrow 1204. In the collapsed state, both F1 and F2 are relatively large, as indicated by the relatively large size of arrow 1014 and arrow 1204. Second magnet 1202 is magnetized parallel to the x-axis, with a magnetization vector pointing towards lens barrel 1002.

Figure 12B:
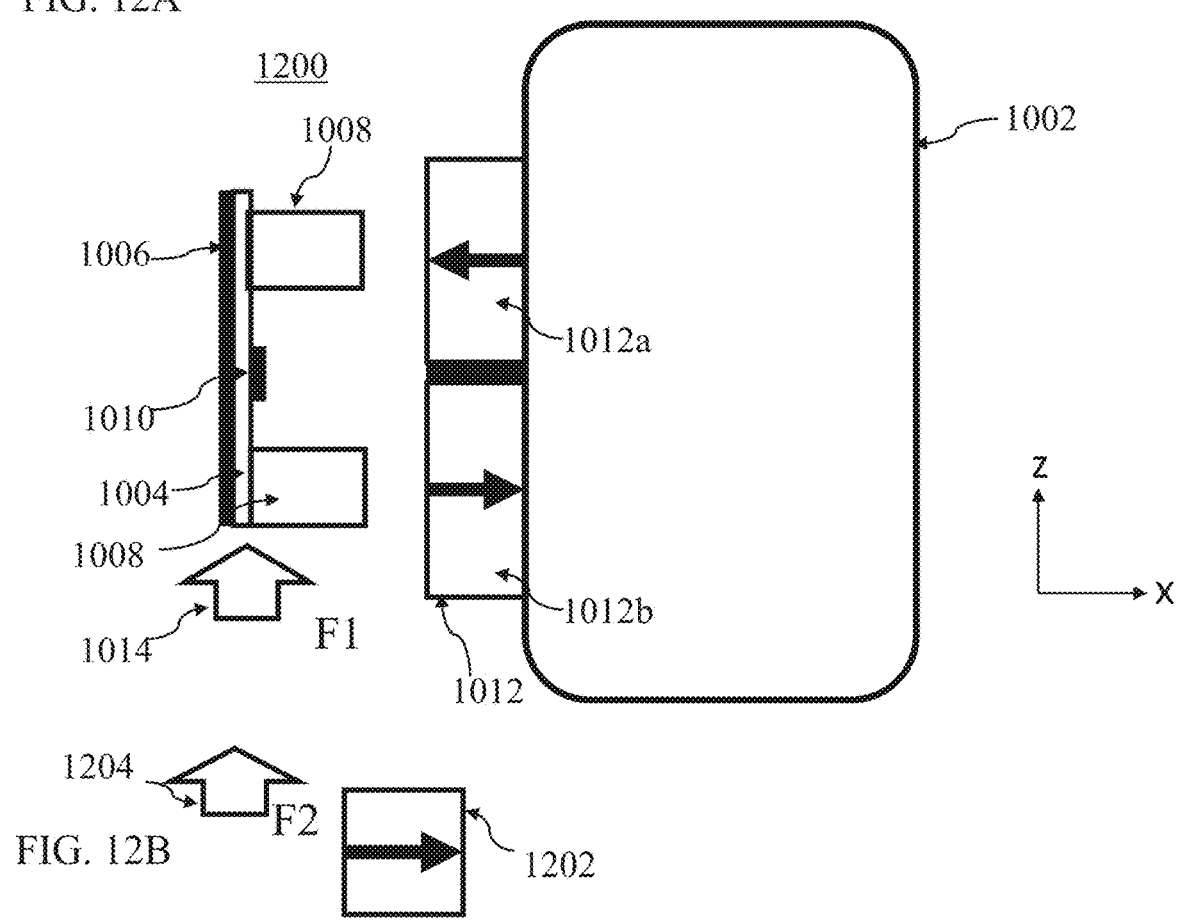
FIG. 12B shows the yet another pop-out assembly of FIG. 12A in a pop-out state and in a cross-sectional view.

FIG. 12B shows P-O assembly 1200 in the same view as FIG. 12A in a P-O state. In the P-O state, both F1 and F2 are relatively small, as indicated by the relatively small size of arrow 1014 and arrow 1204. For F2, this is caused by the fact that second magnet 1202 and first magnet 1012 are farther away from each other than in the collapsed state.

In a POC including one of P-O assembly 1000, P-O assembly 1100, or P-O assembly 1200, yoke 1006, coil 1008, first magnet 1012 and (optionally) magnetic flux sensor 1010 may form a voice coil motor (VCM). The VCM may be operational to axially move lens barrel 1002 including a lens (not shown) parallel to the z-axis and relative to a carrier (not shown) for focusing.

Figure 13A:
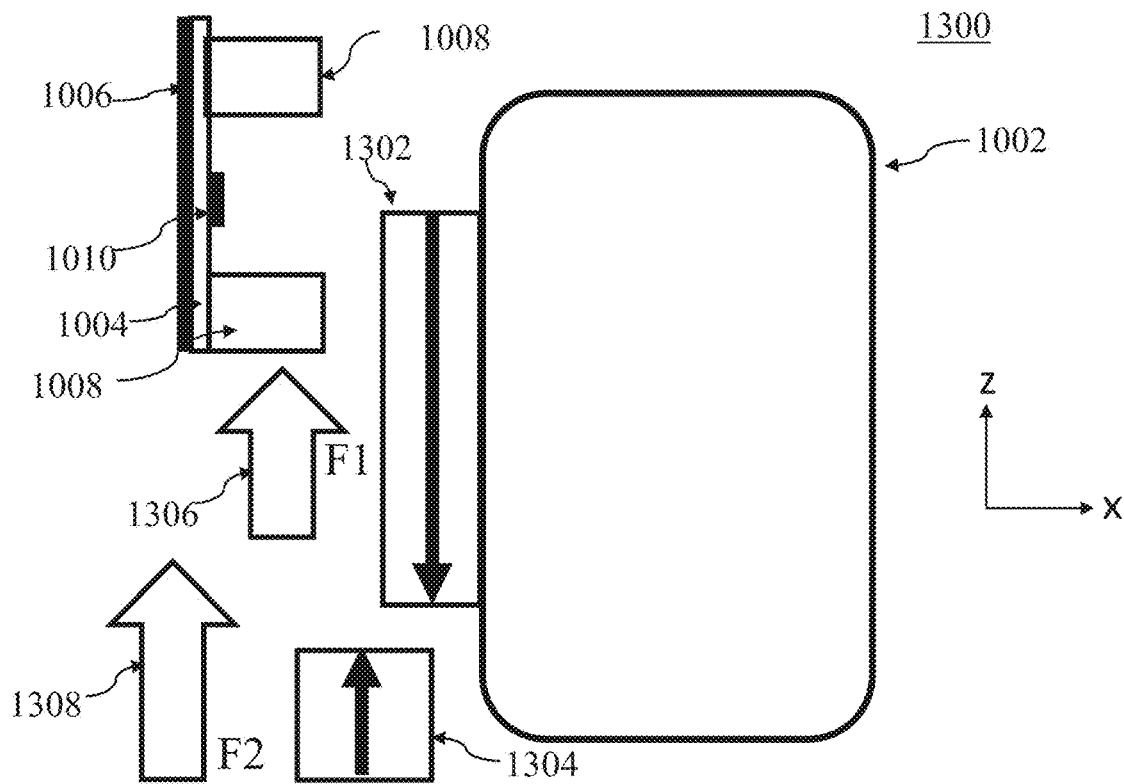
FIG. 13A shows yet another pop-out assembly disclosed herein in a collapsed state and in a cross-sectional view.

FIG. 13A shows a P-O assembly numbered 1300 disclosed herein in a cross-sectional view and in a collapsed state. P-O assembly 1300 represents a second example of a second configuration of a "magnetic spring with repelling magnet" (FIG. 9B). In addition to components described above, P-O assembly 1200 includes a first permanent magnet 1302 which is fixedly coupled to lens barrel 1002 and a second permanent magnet 1304 which is fixedly coupled to a carrier (not shown). Interaction of first magnet 1302 with yoke 1006 creates a first force ("F1") which is directed parallel to the z-axis and pointing upwards, as indicated by arrow 1306. Interaction of first magnet 1302 with second magnet 1304 creates a second force ("F2") which is directed parallel to the z-axis and pointing upwards, as indicated by arrow 1308. In the collapsed state, both F1 and F2 are relatively large, as indicated by the relatively large size of arrow 1306 and arrow 1308. First magnet 1302 is magnetized parallel to the z-axis, with a magnetization vector pointing downwards, i.e. towards an image sensor (not shown). Second magnet 1304 is magnetized parallel to the z-axis, with a magnetization vector pointing upwards.

Figure 13B:
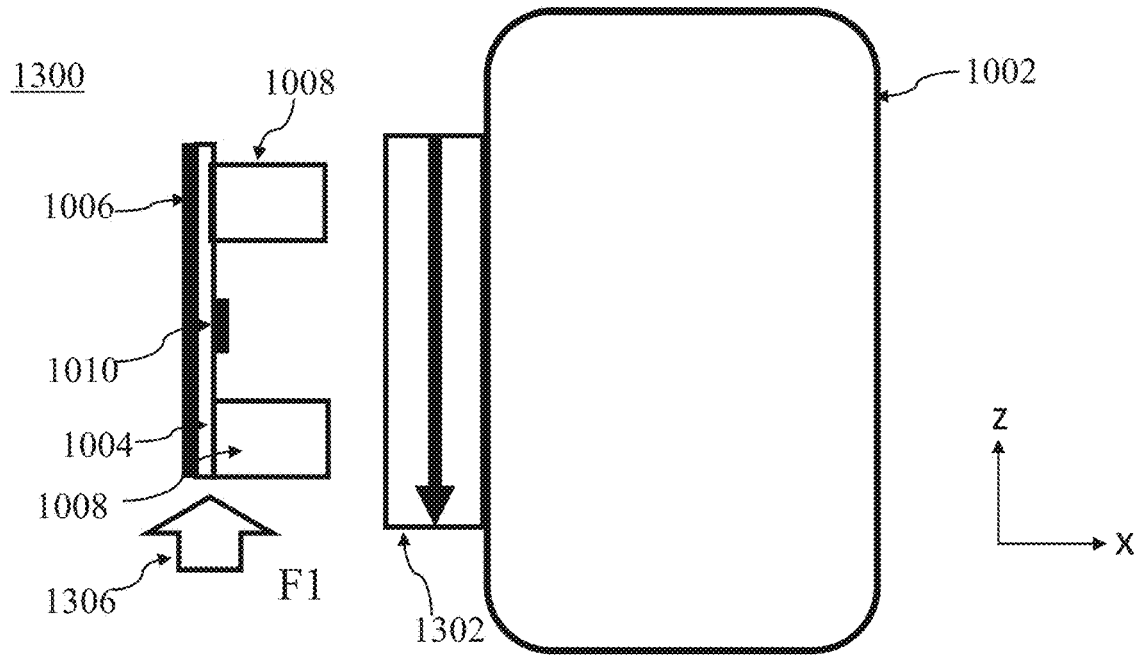
FIG. 13B shows the yet another pop-out assembly of FIG. 13A in a pop-out state and in a cross-sectional view.

FIG. 13B shows P-O assembly 1300 in the same view as FIG. 13A in a P-O state. In the P-O state, both F1 and F2 are relatively small, as indicated by the relatively small size of arrow 1306 and arrow 1308. For F1, this is caused by the fact that first magnet 1302 and yoke 1006 are closer to an equilibrium position than in collapsed state. For F2, this is caused by the fact that first magnet 1302 and second magnet 1304 are farther away from each other than in the collapsed state.

In a POC including P-O assembly 1300, yoke 1006, coil 1008, first magnet 1302 and (optionally) magnetic flux sensor 1010 may form a VCM. The VCM may be operational to axially move lens barrel 1002 including a lens (not shown) parallel to the z-axis and relative to a carrier (not shown) for focusing.

All patents and patent applications mentioned in this specification are herein incorporated by reference into the specification in their entirety, to the same extent as if each individual patent or patent application was specifically and individually indicated to be incorporated by reference. In addition, citation or identification of any reference in this application shall not be construed as an admission that such reference is available as prior art to the present disclosure.

While this disclosure has been described in terms of certain examples and generally associated methods, alterations and permutations of the examples and methods will be apparent to those skilled in the art. The disclosure is to be understood as not limited by the specific examples described herein, but only by the scope of the appended claims.

What is claimed is:

1. A pop-out lens module, comprising:
   an inner part;
   an outer part having an outer part diameter $d_O$;
   a gap between the inner part and outer part having a maximum gap width $W_{G-Max}$;
   a moving lens group fixedly coupled to the inner part, the moving lens group including a plurality of N lens elements and having an optical axis, wherein a maximum lens element diameter of all the moving lens elements is $DA_{Max}$; and
   an actuator that includes two open springs located inside the gap, wherein each open spring is non-helical and comprises a middle section, a first section extending from one end of the middle section, and a second section extending from an opposing end of the middle section, wherein the first and second sections are configured to be displaced towards one another inside the gap when an external force is applied, and are further configured to be displaced away from each other inside the gap when the external force is not applied, wherein a direction of displacement of the first and second sections is oriented parallel to an optical axis of the moving lens group,
   wherein the open springs are operative to move the inner part relative to the outer part in a first direction parallel to the optical axis to an operative state when the external force is not applied, and to move the inner part relative to the outer part in a second direction opposite to the first direction to a collapsed state under the external force.

2. The pop-out lens module of claim 1, wherein $do=DA_{Max}+$a penalty p, wherein 0.5 mm<p<2.5 mm, and wherein 3 mm<$DA_{Max}$<15 mm.

3. The pop-out lens module of claim 2, wherein 0.5 mm<p<2 mm.

4. The pop-out lens module of claim 2, wherein 0.5 mm<p<1.5 mm.

5. The pop-out lens module of claim 2, wherein 0.5 mm<p<1 mm.

6. The pop-out lens module of claim 2, wherein 5 mm<DA<12.5 mm.

7. The pop-out lens module of claim 2, wherein 5 mm<DA<10 mm.

8. The pop-out lens module of claim 1, wherein the open spring has an open spring length $L_{Spring}>W_{G-Max}$.

9. The pop-out lens module of claim 8, wherein 1 mm≤$L_{spring}$≤15 mm.

10. The pop-out lens module of claim 8, wherein 4 mm≤$L_{Spring}$≤8 mm.

11. The pop-out lens module of claim 1, wherein the open spring is 1-folded.

12. The pop-out lens module of claim 1, wherein the open spring is 7-folded.

13. The pop-out lens module of claim 1, wherein the open spring is straight.

14. The pop-out lens module of claim 1, wherein the open spring is curved.

15. The pop-out lens module of claim 1, wherein the open spring is tapered.

16. The pop-out lens module of claim 1, wherein the open spring is angled.

17. The pop-out lens module of claim 1, wherein the open spring has 2-6 serpentines.

18. The pop-out lens module of claim 1, wherein the open spring has 2-4 windings.

19. The pop-out lens module of claim 1, wherein the open spring has an open spring width $W_{Spring}$ and wherein $0.1$ mm $\leq W_{Spring} \leq 1$ mm.

20. The pop-out lens module of claim 19, wherein $0.15$ mm $\leq W_{Spring} \leq 0.5$ mm.

21. The pop-out lens module of claim 1, wherein the open spring has an open spring height in a collapsed state c-$H_{Spring}$ and an open spring height in a pop-out state $H_{Spring}$, and wherein a ratio c-$H_{Spring}/H_{Spring}$ fulfills $\frac{1}{4} \leq$ c-$H_{Spring}/H_{Spring} \leq \frac{3}{4}$.

22. The pop-out lens module of claim 21, wherein the open spring has an open spring height in a collapsed state c-$H_{Spring}$ and an open spring height in a pop-out state $H_{Spring}$, wherein 1 mm $\leq$ c-$H_{Spring} \leq 15$ mm and wherein 1 mm $\leq H_{Spring} \leq 20$ mm.

23. The pop-out lens module of claim 22, wherein 1 mm $\leq$ c-$H_{Spring} \leq 10$ mm and wherein 1 mm $\leq H_{Spring} \leq 15$ mm.

24. The pop-out lens module of claim 22, wherein 1 mm $\leq$ c-$H_{Spring} \leq 8$ mm and wherein 1 mm $\leq H_{Spring} \leq 12$ mm.

25. The pop-out lens module of claim 1, wherein the pop-out lens module includes a kinematic coupling mechanism that provides mechanical accuracy and repeatability to the movement of the inner part relative to the outer part, and wherein the kinematic coupling mechanism includes three pin-groove mechanisms.

26. The pop-out lens module of claim 1, included in a pop-out camera, wherein the pop-out camera has a total track length TTL in the operative state and a collapsed total track length cTTL in the collapsed state, and wherein cTTL/TTL<0.9.

27. The pop-out lens module of claim 26, wherein cTTL/TTL<0.8.

28. The pop-out lens module of claim 26, wherein the pop-out camera includes a retractable cover window and wherein the retractable cover window pushes on the inner part to bring the pop-out camera to the collapsed state.

29. The pop-out lens module of claim 26, wherein the pop-out camera includes a lens formed by the moving lens group.

30. The pop-out lens module of claim 26, wherein the pop-out camera includes a lens, wherein the lens is formed by the moving lens group fixedly coupled to the inner part and by a non-moving lens group fixedly coupled to the outer part.

31. The pop-out lens module of claim 26, wherein the pop-out camera is a Wide camera including a Wide camera image sensor having a sensor diagonal SD in the range of 12-30 mm, wherein the Wide camera has an effective focal length EFL in the range of 5-20 mm, and wherein cTTL/SD<0.7.

32. The pop-out lens module of claim 26, wherein the pop-out camera is a Tele camera having an effective focal length EFL in the range of 10-30 mm, and wherein a ratio cTTL/EFL<0.8.

33. The pop-out lens module of claim 1, wherein the pop-out camera is included in a mobile device.

34. The pop-out lens module of claim 33, wherein the mobile device is a smartphone.

* * * * *